(12) United States Patent
Manning et al.

(10) Patent No.: US 11,696,208 B1
(45) Date of Patent: Jul. 4, 2023

(54) PRIORITY DATA TRANSPORT SERVICE

(71) Applicant: T-Mobile USA, Inc., Bellevue, WA (US)

(72) Inventors: Serge Mukerji Manning, Plano, TX (US); Gregory David Schumacher, Holliston, MA (US)

(73) Assignee: T-Mobile USA, Inc., Bellevue, WA (US)

( * ) Notice: Subject to any disclaimer, the term of this patent is extended or adjusted under 35 U.S.C. 154(b) by 39 days.

(21) Appl. No.: 17/379,466

(22) Filed: Jul. 19, 2021

(51) Int. Cl.
*H04W 40/12* (2009.01)
*H04W 60/04* (2009.01)
*H04W 48/18* (2009.01)

(52) U.S. Cl.
CPC ........... *H04W 40/12* (2013.01); *H04W 48/18* (2013.01); *H04W 60/04* (2013.01)

(58) Field of Classification Search
CPC ...... H04W 40/12; H04W 48/18; H04W 60/04
See application file for complete search history.

(56) References Cited

U.S. PATENT DOCUMENTS

2018/0324577 A1* 11/2018 Faccin .................. H04W 76/27
2019/0394279 A1   12/2019 Dao et al.
2022/0240213 A1*  7/2022 Ly ........................ H04W 60/04
2022/0256417 A1*  8/2022 Ianev .................... H04W 36/08
2022/0272620 A1*  8/2022 Ninglekhu ............ H04W 88/02

FOREIGN PATENT DOCUMENTS

WO    WO2020037666 A1    2/2020

* cited by examiner

*Primary Examiner* — Charles N Appiah
*Assistant Examiner* — Nicole M Louis-Fils
(74) *Attorney, Agent, or Firm* — Lee & Hayes, P.C.

(57) ABSTRACT

Techniques, devices, and systems for implementing a Priority Data Transport Service (PDTS) are disclosed. The PDTS provides authorized devices and/or authorized users with on-demand, priority data transport (e.g., priority Internet access). For example, the PDTS allows authorized devices and/or authorized users to access the Internet, use mobile applications, and/or send and receive image data, video data, and text data in a prioritized manner, as compared to the regular (non-priority) Internet access that is provided to non-subscribers of the PDTS over commercial telecommunications networks. An authorized user may activate and deactivate the PDTS on demand. For instance, the PDTS may be activated during an emergency or crisis situation when networks may be congested, thereby providing the user with priority data transport (e.g., priority Internet access) in an emergency or crisis situation when a telecommunications network may be overloaded.

17 Claims, 11 Drawing Sheets

PRIORITY DATA TRANSPORT SERVICE

BACKGROUND

The United States government has a long-running Priority Telecommunications Service (PTS) program to ensure the public safety and national security and emergency preparedness (NS/EP) communications community has access to priority telecommunications and restoration services to communicate under all circumstances. One PTS service called the Wireless Priority Service (WPS) allows a NS/EP user to use a pre-authorized (or subscribed) device (e.g., a WPS phone) to gain prioritized processing of voice traffic, thereby increasing the probability of call completion. For example, a user of a WPS phone can dial a particular sequence of characters followed by the destination number to make a WPS call, and this WPS call is treated with priority over regular calls. Another PTS service called the Government Emergency Telecommunications Service (GETS) is device-agnostic, which means that a NS/EP user can use any available phone to gain prioritized processing of voice traffic. For example, a NS/EP user who is in possession of a personal identification number (PIN) that is usable to access the GETS may borrow a bystander's phone, dial a specific number, enter their PIN, and a subsequent call using the borrowed phone will be treated with priority over regular calls. When the NS/EP user is finished with the GETS call, the phone returns to normal, unprioritized service. Yet another PTS service called the Next Generation Network Priority Service (NGN-PS) enables NS/EP users to have priority voice, data, and video communications as the communications networks evolve. The Cybersecurity and Infrastructure Security Agency (CISA) is leading the development of priority services for voice over Internet Protocol (VoIP) based networks and will continue planning for data and video priority during future budget years. WPS- and/or GETS-like capabilities are likely to be provided under the NGN-PS.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
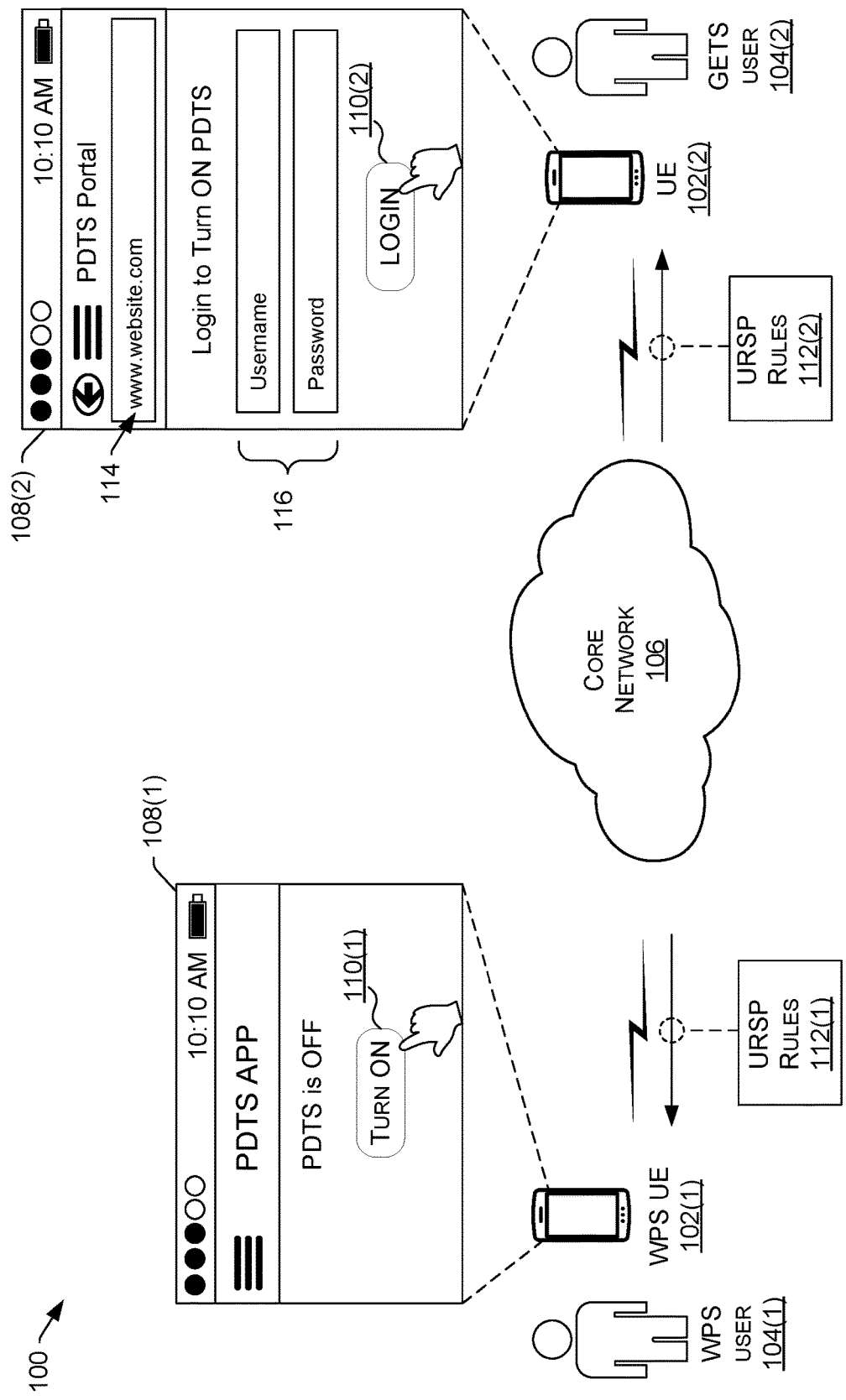
FIG. 1 illustrates an environment in which users may activate a priority data transport service (PDTS) using various techniques, according to various embodiments.

Described herein are techniques, devices, and systems for implementing a Priority Data Transport Service (PDTS), including the activation and deactivation thereof, to provide authorized devices and/or authorized users with on-demand, priority data transport (e.g., priority Internet access). For example, the PDTS allows authorized devices and/or authorized users to access the Internet, use mobile applications, and/or send and receive image data, video data, and text data in a prioritized manner, as compared to the regular (non-priority) Internet access that is provided to non-subscribers of the PDTS over commercial telecommunications networks. An authorized user may activate the PDTS on demand, such as during an emergency or crisis situation when networks may be congested, thereby providing the user with priority data transport (e.g., priority Internet access) in an emergency or crisis situation when a telecommunications network may be overloaded.

The PDTS may be implemented using UE Route Selection Policy (URSP) rules and network slicing. For example, a UE may initially register for multiple network slices. The multiple network slices may include a first (non-priority) network slice, and a second (priority) network slice that is configured to provide higher-priority transport of data packets during PDU sessions than the first network slice. Upon registering for the multiple network slices, the UE can then be used to activate the PDTS on-demand. When the PDTS is activated, the UE is updated with a set of URSP rules that cause the UE to send and receive data packets via the second (priority) network slice during a PDU session, thereby providing priority data transport (e.g., Internet access) to the user of the UE during the PDU session. To activate the PDTS, the user of the UE can provide unique user input, such as by entering a specific uniform resource locator (URL) into a browser to navigate the browser to a PDTS portal, or by launching a PDTS application on the UE, among other ways of activating the PDTS. Based at least in part on the user input received by the UE, the UE receives a new set of URSP rules, which, in some examples, may replace the existing URSP rules in local memory of the UE. The new set of URSP rules include, among other rules, a default rule that causes data traffic for a PDU session to be sent from the UE and received by the UE via the second (priority) network slice. In some examples, the new set of URSP rules cause the UE to send and receive data exclusively over a $3^{rd}$ generation partnership project (3GPP) core network, such as by sending data packets over the air (OTA) via a gNodeB (gNB) to the fifth generation (5G) New Radio (NR) core network. The new set of URSP rules received by the UE thereby prevent data packets from being sent over a WiFi (e.g., a wireless (e.g., IEEE 802.1x-based)) access point (AP) while the PDTS is activated.

After activating the PDTS, the user can deactivate the PDTS similarly by providing unique user input, such as by entering the same, specific URL into the browser to navigate the browser to the PDTS portal, or by launching the PDTS application on the UE, etc. Once the PDTS is deactivated, the UE may revert to using the original URSP rules. For example, if the UE deleted the original URSP rules upon receiving the new, second set of URSP rules, the URSP rules on the UE may be replaced again, this time with the original URSP rules that were stored on the UE prior to activation of the PDTS. Thereafter, when a new PDU session is established, data traffic is routed, by default, according to the original URSP rules, via the first (non-priority) network slice.

The techniques, devices, and systems described herein provide authorized devices and/or authorized users with prioritized data transport (e.g., Internet access), which may be crucial in an emergency or crisis situation, such as by increasing the likelihood of emergency response services being provisioned to people in need of assistance, by helping select officials access information and/or transmit images, video, etc. with a service and/or with others, for example. The techniques, devices, and systems described herein improve traditional approaches to network slicing and implementing URSP rules to support on-demand activation and deactivation of the PDTS for PDU sessions established over a telecommunications network (e.g., 5G NR network). Furthermore, the techniques, devices, and system described herein allow for expanding the existing PTS programs capabilities beyond just voice by providing priority data transport to wireless packets carrying non-voice data (e.g., video data, image data, text data, etc.). For example, the PDTS can provide authorized devices and/or authorized users with prioritized access to public websites, agency-specific (or enterprise-specific) applications, and the like, in order to send and receive non-voice data (e.g., videos, images, text, etc.) with priority. In other words, whenever an authorized user would like to ensure that a PDU session is successfully established and remains uninterrupted, the user can activate the PDTS so that a PDU session will be treated with priority over regular PDU sessions of regular users. The techniques, devices, and systems described herein also provide for a streamlined delivery of the PDTS to authorized NS/EP users, and a common way for wireless carriers to provide the PDTS to their NS/EP customers.

Moreover, the techniques, devices, and systems described herein ensure that data traffic is carried with priority over a 3GPP telecommunications core network (e.g., 5G NR core network) by preventing data from being transmitted over WiFi. That is, when the PDTS is activated for a UE, the UE is updated with a new set of URSP rules that prevent the UE from bypassing the 3GPP 5G NR and 5G core network. For example, the new set of URSP rules received by the UE in response to activation of the PDTS can control the routing of data packets exclusively over bearers where priority service is supported, thereby ensuring that, when the PDTS is activated, data traffic does not flow over WIFI. The techniques, devices, and systems described herein may further allow one or more devices to conserve resources with respect to processing resources, memory resources, networking resources, power resources, etc., in the various ways described herein. For example, by selectively providing authorized devices and/or authorized users with on-demand access to the PDTS, networking resources may be conserved for those individuals who are authorized to receive priority Internet access in a situation where the telecommunications network may be overloaded and congested, such as during an emergency or crisis situation.

An example process to be implemented by a UE can include registering for a first network slice and a second network slice, wherein the second network slice is configured to provide higher priority transport of data packets during PDU sessions than the first network slice, receiving user input to activate a PDTS, receiving, based at least in part on the user input, a set of URSP rules and storing the set of URSP rules in memory of the UE, and sending, based at least in part on a URSP rule of the set of URSP rules, one or more data packets during a PDU session via at least one of: the second network slice, or a third network slice that is configured to provide higher priority transport of data packets during PDU sessions than the first network slice.

An example process to be implemented by a network node(s) can include registering a UE for a first network slice and a second network slice, wherein the second network slice is configured to provide higher priority transport of data packets during PDU sessions than the first network slice, receiving, from the UE, a PDU session establishment request via the second network slice, sending, to the UE, a set of URSP rules to the UE, and routing one or more subsequent data packets associated with a PDU session involving the UE via at least one of: the second network slice, or a third network slice that is configured to provide higher priority transport of data packets during PDU sessions than the first network slice.

Also disclosed herein are systems and devices comprising one or more processors and one or more memories, as well as non-transitory computer-readable media storing computer-executable instructions that, when executed, by one or more processors perform various acts and/or processes disclosed herein.

FIG. 1 illustrates an environment 100 in which users may activate a priority data transport service (PDTS) using various techniques, according to various embodiments. The environment 100 may include a first user equipment (UE) 102(1) used by a first user 104(1), and a second UE 102(2) used by a second user 104(2). The first user 104(1) may represent an authorized user of the WPS (or the NGN-PS with WPS-like capabilities), and is sometimes referred to herein as a "WPS user 104(1)" accordingly. Furthermore, the first UE 102(1) may represent an authorized UE that is subscribed to the PDTS, and is sometimes referred to herein as a "WPS UE 102(1)" accordingly. Meanwhile, the second user 104(2) may represent an authorized user of the GETS (or the NGN-PS with GETS-like capabilities), and is sometimes referred to herein as a "GETS user 104(2)" accordingly. The second UE 102(2) may, therefore, represent any UE, such as a UE that is not subscribed to the PDTS (e.g., a non-WPS UE). The users 104 may represent people who have received an account (e.g., user account, subscriber account, etc.) that provides them with access to the PDTS over commercial telecommunications networks. For instance, the users 104 may represent state, local, or tribal government NS/EP officials, individuals in the private sector who are authorized to use the PDTS, or the like.

In accordance with various embodiments described herein, the terms "user equipment (UE)," "wireless communication device," "wireless device," "communication device," "mobile device," "client device," "electronic device," and "device" may be used interchangeably herein to describe any UE (e.g., the UEs 102) that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), Voice over NR (VoNR), IEEE 802.1x protocols, WiMAX, Wi-Fi, Data Over Cable Service Interface Specification (DOCSIS), digital subscriber line (DSL), and/or any future IP-based network technology or evolution of an existing IP-based network technology, including 5G NR networking protocols, and/or existing or legacy network technology, such as second generation (2G), third generation (3G), fourth generation (4G), including circuit-switched networking protocols and/or packet-switched networking protocols. The UEs 102 may be implemented as any suitable type of computing device configured to communicate over a wireless network, including, without limitation, a mobile phone (e.g., a smart phone/handset), a tablet computer, a laptop computer, a portable digital assistant (PDA), a wearable computer (e.g., electronic/smart glasses, a smart watch, fitness trackers, head-mounted display (HMD), etc.), an in-vehicle (e.g., in-car) computer, and/or any similar mobile device, as well as situated computing devices including, without limitation, a television (smart television), set-top-box (STB), desktop computer, and the like.

In general, the users 104 can utilize their UEs 102 to communicate with other computing devices of a telecommunications network, such as via a core network 106, as illustrated in FIG. 1. The core network 106 of FIG. 1 may represent an Internet Protocol Multimedia Subsystem (IMS) core network, sometimes referred to herein as "IMS core," "IMS network," "Core Network (CN)," or "IM CN Subsystem". The IMS core is an architectural framework defined by the 3GPP for delivering Internet Protocol (IP) multimedia to a UE, such as the UEs 102. The IMS core can be maintained and/or operated by one or more service providers, such as one or more wireless carriers (or "operators"), that provide IMS-based services to users (sometimes called "subscribers") who are associated with UEs, such as the UEs 102. For example, a service provider may offer multimedia telephony services that allow a subscribed user to call or message other users via an IMS core using his/her UE. A user can also utilize an associated UE to receive, provide, or otherwise interact with various different IMS-based services by accessing computing devices of an IMS core. In this manner, an operator of an IMS core may offer any type of IMS-based service, such as, telephony services, emergency services (e.g., E911), gaming services, instant messaging services, presence services, video conferencing services, social networking and sharing services, location-based services, push-to-talk services, texting services, real-time text (RTT) services, web browsing, and so on. In order to access these services, a UE 102 is configured to request establishment of a communication session. In the case of non-voice services, such as Internet services, texting services, and the like, such a communication session may comprise a PDU session.

The UEs 102 are each configured to utilize various access networks, including radio access networks (RANs) and/or radio access technologies (RATs), in order to access certain network nodes of the core network 106. UEs that are 5G NR-compliant may be configured to communicate with heterogeneous cellular networks by employing radios that can communicate over 5G systems (or "5G networks") as well as over legacy or predecessor systems (or "legacy networks") relative to 5G systems. Similarly, UEs that are 4G LTE-compliant may be configured to communicate within heterogeneous cellular networks by employing radios that can communicate over LTE systems (or "LTE networks") as well as over legacy or predecessor systems (or "legacy networks") relative to 4G systems. Today's legacy networks, such as 3G and 2G networks, may employ circuit-switching for voice communications, while 5G and 4G networks employ packet-switching for both data and voice communications in an all-IP data transport technology. In general, 4G LTE-compliant UEs and 5G NR-compliant UEs are configured to prefer attachment to corresponding networks, which offer relatively high data-rate throughput as compared to available legacy or predecessor networks. In most UEs, a choice of which protocol to employ depends primarily on what networks are available to the UE at the UE's present geographic location. Furthermore, in instances where the preferred network (e.g., 4G, 5G, etc.) is unavailable or unusable for any reason, legacy networks, if available, may be used as a fallback protocol, such as by using a circuit-switch fallback (CSFB) mechanism. The UEs 102 of FIG. 1 can comprise a UE with such capabilities to allow for communication over any type of telecommunications network. Accordingly, in the case of 5G NR-compliant UEs, the core network 106 may, in some examples, include network nodes of a 5G system, such as a policy control function (PCF), a session management function (SMF), an access and mobility management function (AMF), an authentication server function (AUSF), and the like. Accordingly, the UEs 102 may be configured to access such network nodes via a gNodeB of an available 5G NR RAN.

FIG. 1 illustrates example techniques for activating a PDTS. In the example of FIG. 1, both of the users 104(1) and 104(2) are subscribed to the PDTS as subscribed users. The first UE 102(1) is also subscribed to the PDTS as a subscribed device. However, the second UE 102(2) represents a generic UE that is not subscribed to the PDTS. Each UE 102 may perform an initial device registration procedure in order to access the 5G system, which may be included in the core network 106 depicted in FIG. 1. If successful, a registered UE 102 that has completed the initial device registration procedure will be able to establish a radio link in order to transmit data to, and receive data from, particular nodes in the core network 106. The initial device registration procedure may include, among other sub-procedures, requesting registration for one or more network slices.

Network slicing is a feature of 5G networks. In 3GPP, a network slice is a logical end-to-end network that can be dynamically created. A given UE, such as the UE 102(1), may access one or more network slices over the same Access Network (e.g., over the same radio interface). Each network slice for which the UEs 102 are registered may provide networking service with an agreed-upon Service-Level Agreement (SLA). A given network slice may be identified by a value of a Single Network Slice Selection Assistance Information (S-NSSAI) parameter that is assigned to the network slice. Accordingly, the UEs 102 can register for one or more network slices by including the value(s) of the S-NSSAI parameter(s) for the requested network slice(s) in the registration request. In this case, each of the UEs 102 in FIG. 1 may register for multiple network slices including a first network slice and a second network slice. The first network slice may be associated with one or more performance parameters (e.g., a Quality of Service (QoS) parameter) that provide regular, non-priority transport of data packets during PDU sessions. Meanwhile, the second network slice may be associated with one or more performance parameters (e.g., a QoS parameter) that provide higher priority transport of data packets during PDU sessions than the first network slice. In some examples, the first network slice may be an enhanced Mobile Broadband (eMBB) network slice. However, the second network slice may differ for the respective UEs 102(1) and 102(2) depicted in FIG. 1. For example, the WPS UE 102(1) may register for a first, eMBB network slice and a second, PDTS network slice, while the generic UE 102(2) may register for the first, eMBB network slice and a second, PDTS non-subscriber network slice. In other words, the generic UE 102(2) may not be authorized to register for and/or utilize the PDTS network slice until the user 104(2) of the UE 102(2) successfully authenticates with the PDTS. Still, in either case, each UE 102 registers for multiple network slices; one network slice that is a non-priority network slice, and another network slice that is a priority network slice.

In some examples, after the respective UEs 102 have registered for multiple network slices, the UEs 102 may establish respective PDU sessions to register for IMS-based services over the respective PDU sessions. For example, a UE 102 may identify a proxy call session control function (P-CSCF) node of the core network 106 and send a registration request via a gNB to an address of the identified P-CSCF node. As used herein, a "request" is a message that is sent from a UE 102 to a network node of the core network 106, and a "response" is a message that is sent from a network node of the core network 106 to a UE 102. This construct may be used when discussing communications that use any particular signaling protocol, Session Initiation Protocol (SIP) being one example protocol that can be used to send requests and receive responses. For example, SIP may be used by the UEs 102 for transmitting messages to/from a network node of the core network 106. Accordingly, a "SIP request" is a message that is sent from a UE 102 to the core network 106 using SIP protocol, and a "SIP response" is a message that is sent from the core network 106 to a UE 102 using SIP protocol. SIP is a signaling protocol that can be used to establish, modify, and terminate multimedia sessions over packet networks, and to authenticate access to IMS-based services. Accordingly, during IMS registration, a UE 102 may send a SIP request (e.g., a registration request) using the SIP REGISTER method as part of the initial procedures for registering for IMS-based services.

Additionally, or alternatively, after the respective UEs 102 have registered for multiple network slices, the users 104 can utilize their UEs 102 to establish communication sessions. For example, the UEs 102 can establish respective PDU sessions such that the UEs 102 may access the Internet via the core network 106, for example. Before activating the PDTS, each of the UEs 102 may establish a PDU session via the first (non-priority) network slice for which the UEs 102 previously registered. At any time, either user 104 may activate (or "turn on") the PDTS by providing unique user input via his/her UE 102. Example types of user input to activate the PDTS are depicted in FIG. 1.

For example, the WPS user 104(1) may provide, and the WPS UE 102(1) may receive, user input that corresponds to launching an application (sometimes referred to herein as a client application, a mobile application, or the like). For example, FIG. 1 depicts an example user interface (UI) 108(1) presented on a display of the UE 102(1) after the user 104(1) has provided user input to launch a PDTS application (e.g., by selecting an icon for the PDTS application on a touch screen of the UE 102(1)). At a time when the user 104(1) launches the PDTS application, the UE 102(1) may have stored, in local memory of the UE 102(1), a first set of URSP rules. In general, URSP rules may govern how a UE 102 behaves in terms of routing outgoing traffic. In the present disclosure, the first set of URSP rules stored in memory of the first UE 102(1) at a time when the user 104(1) launches the PDTS application may include a default URSP rule that causes the UE 102(1) to send data packets during a PDU session via the first (non-priority) network slice. In other words, the default URSP rule in the first set of URSP rules causes the UE 102(1) to direct traffic (e.g., all traffic) to the first network slice, such as an eMBB network slice. The first set of URSP rules may further include a URSP rule at the highest precedence with S-NSSAI$_{PDTS}$, and, in some examples, a specific data network name (DNN)$_{PDTS}$ and perhaps other parameters and traffic description matching an app identifier (ID) for the PDTS application. Accordingly, when the user 104(1) launches the PDTS application to activate the PDTS, logic of the UE 102(1) determines that a URSP rule of the first set of URSP rules matches the app ID of the PDTS application, which indicates that the user 104(1) would like to activate the PDTS and the packet matching the highest precedence URSP rule is directed over the S-NSSAI$_{PDTS}$ slice. As depicted in FIG. 1, the user 104(1) may select a button 110(1) (e.g., a "Turn ON" button, icon, element, etc.) in order to activate the PDTS, which may be additional user input in addition to the user input to launch the PDTS application. In response to the user 104(1) launching the PDTS application and the UE 102(1) determining that the URSP rule matches the app ID of the PDTS application (and, in some examples, after the UE 102(1) is authenticated as a WPS subscriber), the UE 102(1) may send a PDU session establishment request for the second (priority) network slice (e.g., S-NSSAI$_{PDTS}$). In some examples, the PDU session establishment request may include a specific DNN$_{PDTS}$ and perhaps other parameters. In some examples, the UE 102(1) may re-register for IMS-based services (e.g., if previously registered for the IMS-based services) over the new priority PDU session in order to receive priority for the IMS-based services. Furthermore, a UE configuration update may be initiated for the UE 102(1), wherein the UE 102(1) receives a second set of URSP rules 112(1) and stores the second set of URSP rules 112(1) in the memory of the UE 102(1). In some examples, the UE 102(1) deletes the existing, first set of URSP rules at a time of receiving the second set of URSP rules 112(1) in order to replace the first set of URSP rules in the memory of the UE 102(1). In other examples, the original, first set of URSP rules may be maintained (or kept) in the memory of the UE 102(1), and the UE 102(1) may use a pointer to reference the new, second set of URSP rules 112(1) going forward. The second set of URSP rules 112(1) received by the UE 102(1) during the UE configuration update may include a default URSP rule that causes the UE 102(1) to send data packets (e.g., all data packets) during a PDU session via the second (priority) network slice. In other words, the default URSP rule in the second set of URSP rules 112(1) causes the UE 102(1) to direct traffic (e.g., all traffic) to the second network slice, such as a PDTS network slice. Since the second (priority) network slice provides higher priority transport of data packets during PDU sessions than the first (non-priority) network slice (e.g., by virtue of a different QoS parameter(s) and/or other performance parameters associated with the second network slice), the second set of URSP rules 112(1) will cause the UE 102(1) to send data packets with priority via the second (priority) network slice during any PDU session that is established after the PDTS has been activated.

FIG. 1 also depicts another example technique for activating the PDTS with respect to the GETS user 104(2). It is to be appreciated that this other example technique may be utilized with the WPS user 104(1) as well. In the example of FIG. 1, the GETS user 104(2) may provide, and the generic UE 102(2) may receive, user input that corresponds to navigating a browser to a web site. For example, FIG. 1 depicts an example user interface (UI) 108(2) presented on a display of the UE 102(2) after the user 104(2) has provided user input to enter a specific Uniform Resource Locator (URL) 114 into a browser, the URL causing the browser to navigate to a PDTS portal. At a time when the user 104(2) navigates the browser to the PDTS portal, the UE 102(2) may have stored, in local memory of the UE 102(2), a first set of URSP rules that governs how the UE 102(2) behaves in terms of routing outgoing traffic. For example, the first set of URSP rules stored in memory of the second UE 102(2) at a time when the user 104(2) navigates the browser to the PDTS portal may include a default URSP rule that causes the UE 102(2) to send data packets during a PDU session via the first (non-priority) network slice. In other words, the default URSP rule in the first set of URSP rules causes the UE 102(2) to direct all traffic to the first network slice, such as an eMBB network slice. The first set of URSP rules may further include a URSP rules at the highest precedence with S-NSSAI$_{PDTS\text{-}nonsub}$, and, in some examples, a specific DNN$_{PDTS\text{-}nonsub}$ and perhaps other parameters and traffic description matching an ID of the site to which the user 104(2) navigated the browser. The ID of the site may be in the form of an address or a fully qualified domain name (FQDN) of the PDTS portal. Accordingly, when the user 104(2) navigates the browser to the PDTS portal to activate the PDTS, logic of the UE 102(2) determines that a URSP rule of the first set of URSP rules specifies the site ID of the PDTS portal, which indicates that the user 104(2) would like to activate the PDTS. In response to the user 104(2) navigating the browser to the PDTS portal and the UE 102(2) determining that the URSP rule specifies the site ID of the PDTS portal, the UE 102(2) may send a PDU session establishment request for the second (PDTS non-subscriber) network slice (e.g., S-NSSAI$_{PDTS\text{-}nonsub}$). In some examples, the PDU session establishment request may include a specific DNN$_{PDTS\text{-}nonsub}$ and perhaps other parameters. In some examples, the act of sending a HTTP GET to the matching URL initiates the PDU session establishment request. As depicted in FIG. 1, the user 104(2) may enter credentials 116 (e.g., a username and/or a password) via the site and may select a button 110(2) (e.g., a "LOGIN" button, icon, element, etc.) to activate the PDTS, which may be additional user input in addition to the user input to navigate the browser to the PDTS portal. In this case, because the UE 102(2) is generic and is not already subscribed to the PDTS, the credentials 116 entered by the GETS user 104(2) via the PDTS portal are processed to authenticate the GETS user 104(2), which ensures that the user 104(2) is subscribed to the PDTS. In response, a UE configuration update may be initiated for the UE 102(2), wherein the UE 102(2) receives a second set of URSP rules 112(2) and stores the second set of URSP rules 112(2) in the memory of the UE 102(2). Again, in some examples the second set of URSP rules 112(1) may replace the first set of URSP rules in the memory of the UE 102(2) (e.g., the UE 102(2) may delete the first set of URSP rules from the memory of the UE 102(2) at a time of receiving the second set of URSP rules 112(2)). In other examples, the original, first set of URSP rules remain stored in the memory of the UE 102(2) despite receiving the second set of URSP rules 112(2) and a pointer or a similar mechanism may be utilized to determine which set of rules to utilize for controlling traffic sent from the UE 102(2). The second set of URSP rules 112(2) received by the UE 102(2) during the UE configuration update may include a default URSP rule that causes the UE 102(2) to send data packets (e.g., all data packets) during a PDU session via a (priority) network slice, such as a PDTS network slice. In the case of the GETS user 104(2) and the generic UE 102(2), the UE 102(2) may have initially registered for a second (priority) network slice, such as a PDTS non-subscriber network slice that is used during a PDU session to authenticate the GETS user 104(2) via the PDTS portal. Subsequently, after the GETS user 104(2) is authenticated, one or more network nodes in the core network 106 may authorize the UE 102(2) to route traffic via a third (priority) network slice, such as the PDTS network slice. In other words, the core network transitions the UE 102(2) to the third (priority) network slice after successfully authenticating the GETS user 104(2), even though the UE 102(2) itself does not have a subscription to the PDTS and, therefore, did not previously register for the third (priority) network slice for which subscribed UEs can register. In any case, the default URSP rule in the second set of URSP rules 112(2) causes the UE 102(2) to direct all traffic to the third (priority) network slice, such as the PDTS network slice. Since the third (priority) network slice provides higher priority transport of data packets during PDU sessions than the first (non-priority) network slice (e.g., by virtue of a different QoS parameter(s) and/or other performance parameters associated with the third (priority) network slice), the second set of URSP rules 112(2) will cause the UE 102(2) to send data packets with priority via the third (priority) network slice during any PDU session that is established after the PDTS has been activated.

Figure 2A:
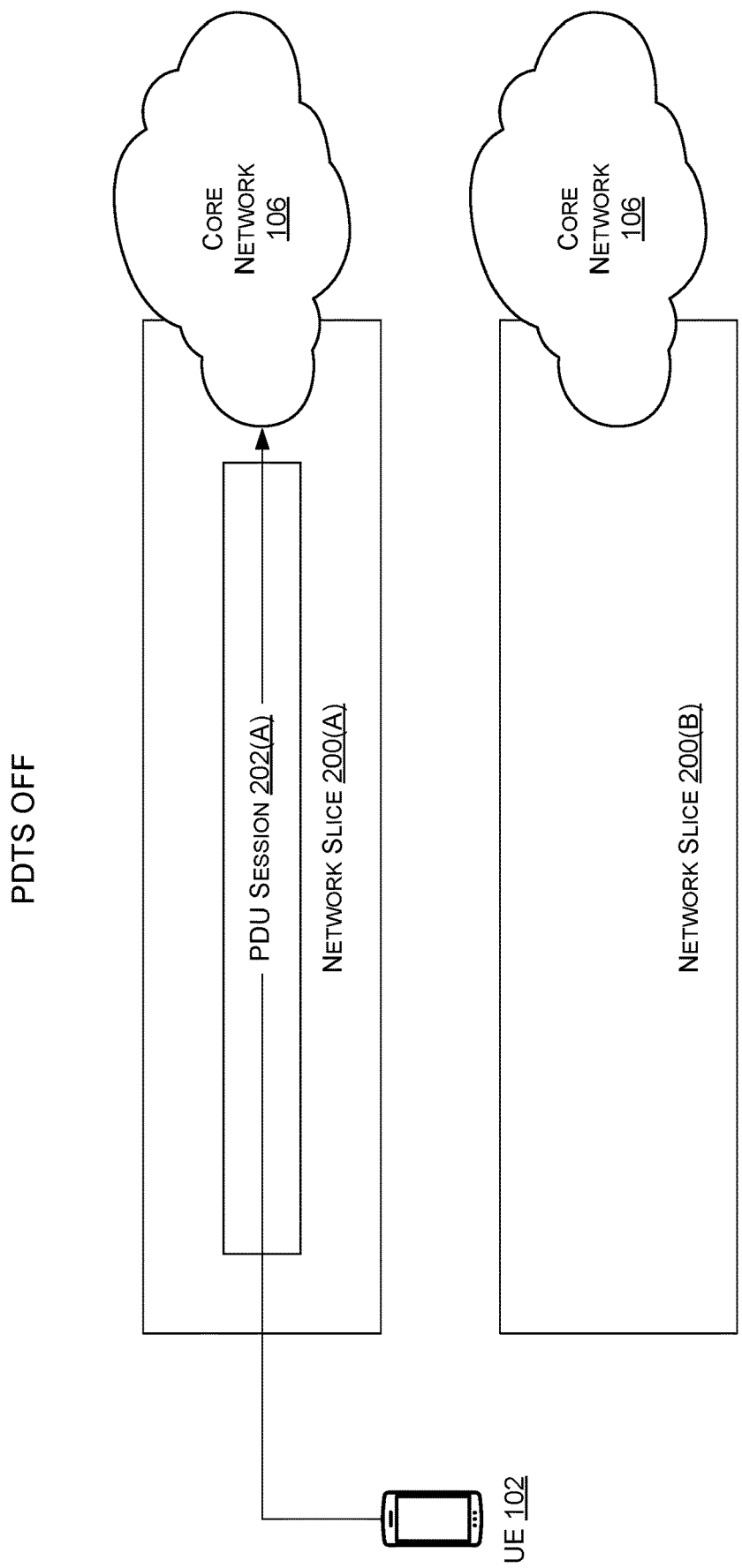
FIG. 2A is a diagram illustrating a user equipment (UE) that is registered for multiple network slices, as well as the UE establishing a protocol data unit (PDU) session over a first network slice of the multiple network slices while the PDTS is deactivated (or OFF), the first network slice providing transport of data sent from the UE during the PDU session without priority.

FIG. 2A is a diagram illustrating a UE 102, which may represent either the UE 102(1) or the UE 102(2) depicted in FIG. 1. As described above, during an initial attach procedure, a UE 102 can register for multiple network slices 200 by including the respective values of the S-NSSAI parameter for the requested network slices 200 in the registration request. In the example of FIG. 2A, the UE 102 may register for a first network slice 200(A), such as an eMBB network slice, which may be associated with one or more performance parameters (e.g., a QoS parameter(s)) that provide regular, non-priority transport of data packets during PDU sessions. In the case of a WPS UE 102(1), the UE 102 may also register for a second network slice 200(B) in the form of a PDTS network slice. This second network slice 200(B) may be associated with one or more performance parameters (e.g., a QoS parameter(s)) that provide higher priority transport of data packets during PDU sessions than the first network slice 200(A). In the case of a generic UE 102(2), the UE 102 may register for a second network slice in the form of a PDTS non-subscriber network slice (not shown in FIG. 2A), and, if the GETS user 104(2) of the generic UE 102(2) is authenticated during an attempt to activate the PDTS, the UE 102(2) may ultimately utilize the second network slice 200(B), such as the PDTS network slice, during a PDU session. Regardless of the type of UE 102, the UE 102 registers for multiple network slices 200.

FIG. 2A illustrates a scenario where the PDTS is "OFF" (or deactivated). Accordingly, while the PDTS is OFF, when the user 104 of the UE 102 accesses the Internet, a PDU session 202(A) is established such that the UE 102 sends one or more data packets to the core network 106 during the PDU session 202(A) via the first network slice 200(A) without priority. This control over the routing of outgoing data packets is provided by the existing set of URSP rules stored in local memory of the UE 102. Accordingly, FIG. 2A may illustrate a PDU session 202(A) that is established on behalf of the UE 102 prior to the UE 102 having received the user input to activate the PDTS, as illustrated in FIG. 1, which means that a first set of URSP rules governs how the UE 102 behaves in terms of routing outgoing traffic; namely, by routing network traffic via the first network slice 200(A).

Figure 2B:
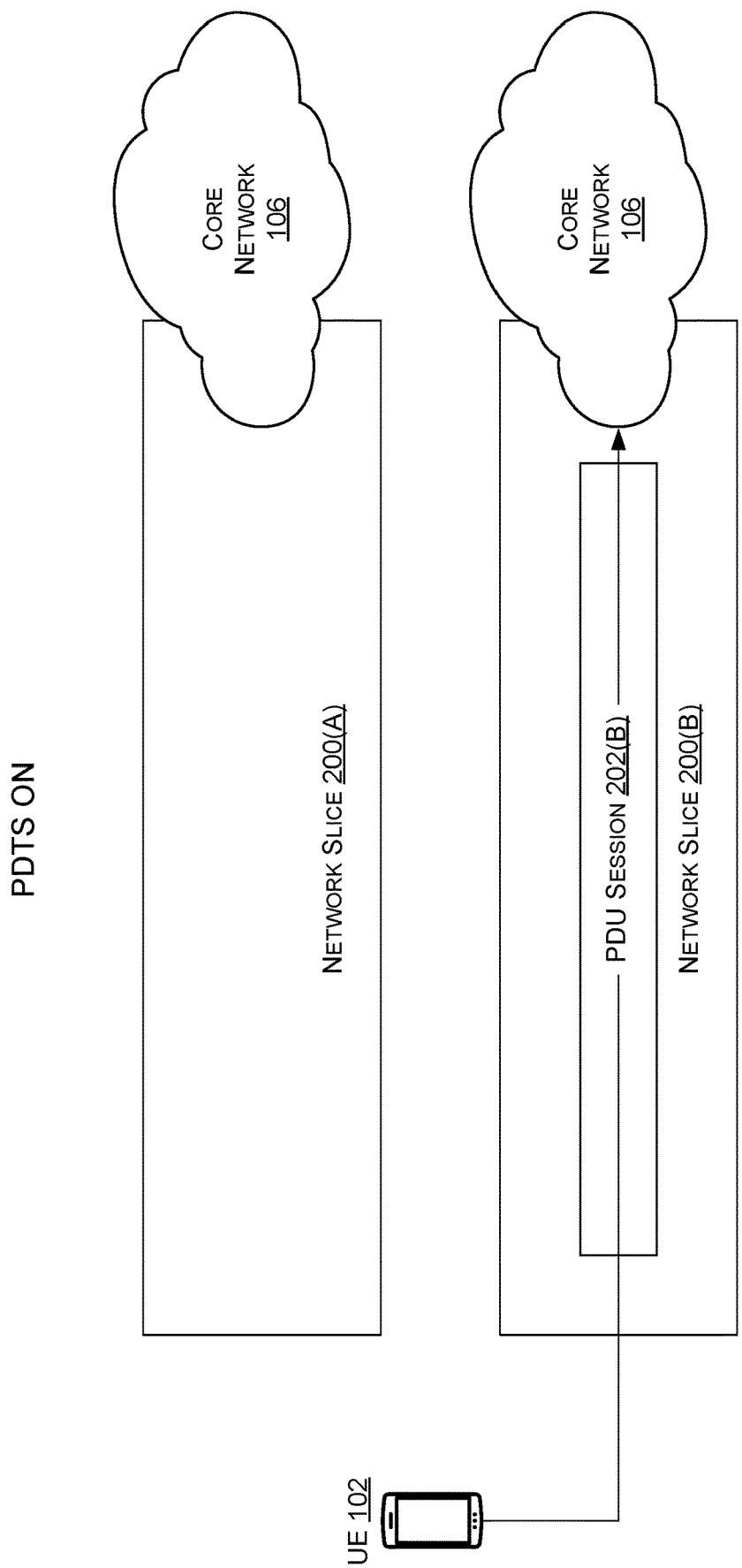
FIG. 2B is a diagram illustrating the registered UE of FIG. 2A establishing a PDU session over a second network slice of the multiple network slices while the PDTS is activated (or ON), the second network slice providing transport of data sent from the UE during the PDU session with priority.

FIG. 2B illustrates a scenario where the PDTS is "ON" (or activated). Accordingly, while the PDTS is ON, when the user 104 of the UE 102 accesses the Internet, a PDU session 202(B) is established such that the UE 102 sends one or more data packets to the core network 106 during the PDU session 202(B) via the second network slice 200(B) with priority. This control over the routing of outgoing data packets is provided by the received set of URSP rules 112 stored in local memory of the UE 102. Accordingly, FIG. 2B may illustrate a PDU session 202(B) that is established on behalf of the UE 102 after the UE 102 has received the user input to activate the PDTS, as illustrated in FIG. 1, which means that a second set of URSP rules 112 governs how the UE 102 behaves in terms of routing outgoing traffic; namely, by routing network traffic via the second network slice 200(B). This also assumes that the UE 102 and/or the user 104 is authenticated with respect to the PDTS as a subscribed device and/or a subscribed user, respectively. The user 104 of the UE 102 is able to toggle the PDTS ON and OFF by providing the user input illustrated by way of example and not limitation in FIG. 1 (e.g., by launching the PDTS app or by navigating a browser to a site for the PDTS portal).

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 3:
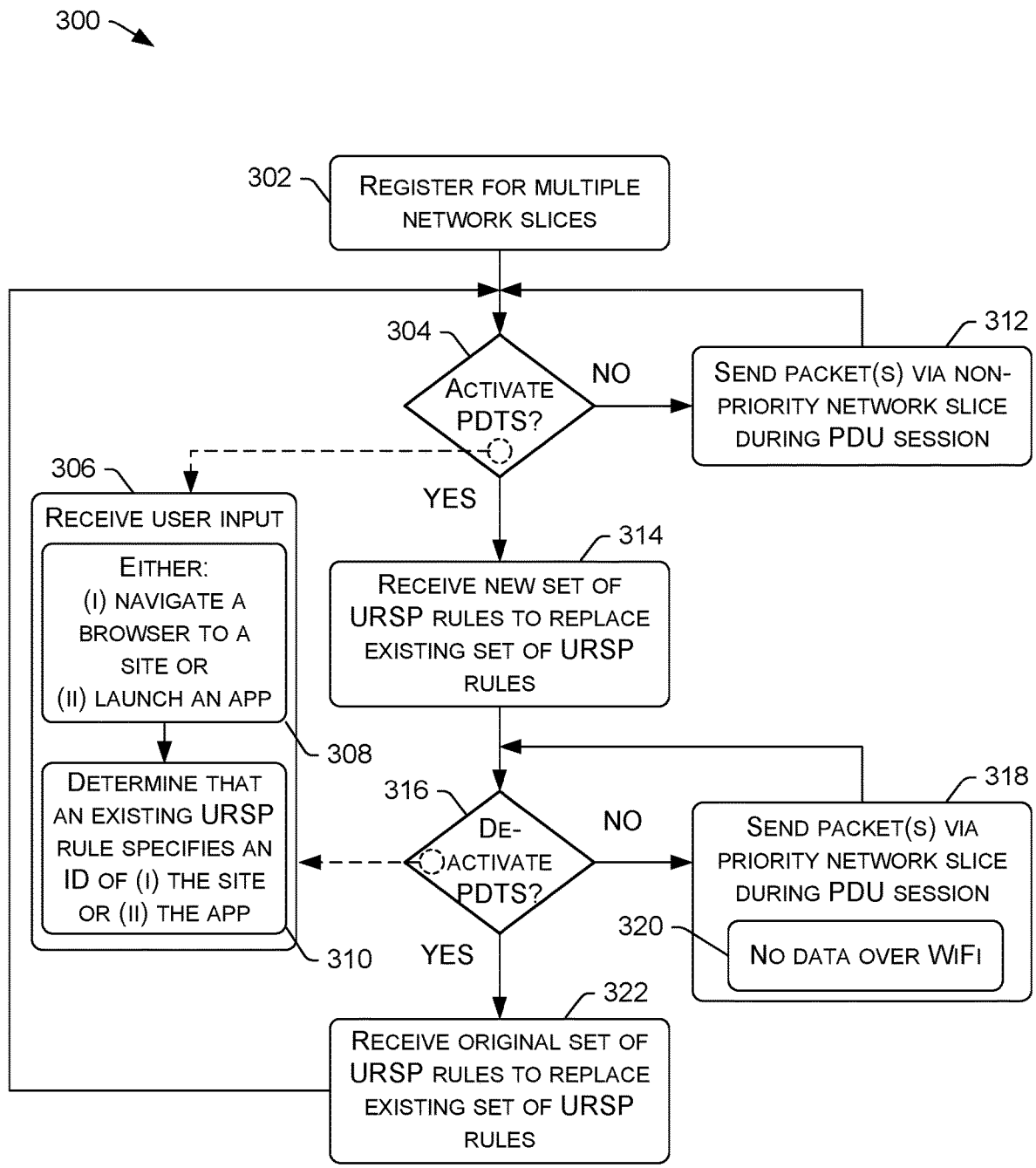
FIG. 3 illustrates a flowchart of an example process for activating, and subsequently deactivating, the PDTS, according to various embodiments.

FIG. 3 illustrates a flowchart of an example process 300 for activating, and subsequently deactivating, the PDTS, according to various embodiments. The process 300 is described with reference to the previous figures.

At 302, a UE 102 may register for multiple network slices 200. The multiple network slices 200 may include a first network slice 200(A) and a second network slice (e.g., 200(B)). The second network slice is configured to provide higher priority transport of data packets during PDU sessions than the first network slice 200(A). For example, the first network slice 200(A) may be an eMBB network slice. In an example where the UE 102 is a WPS UE 102(1) that is subscribed to the PDTS, the second network slice 200(B) for which the UE 102 registers at block 302 may be a PDTS network slice. In an example where the UE 102 is a generic UE 102(2) that is not subscribed to the PDTS, the second network slice for which the UE 102 registers at block 302 may be a PDTS non-subscriber network slice. In an illustrative example, if the UE 102 is a WPS UE 102(1), the UE 102 may send a registration request at block 302 with the requested NSSAI: {S-NSSAI$_{PDTS}$, S-NSSAI$_{eMBB}$}. Alternatively, if the UE 102 is a generic UE 102(1), the UE 102 may send a registration request at block 302 with the requested NSSAI: {S-NSSAI$_{PDTS-nonsub}$, S-NSSAI$_{eMBB}$}.

At 304, the UE 102 may determine whether the user 104 has requested to activate the PDTS. For example, at sub-block 306, the UE 102 may determine whether it has received user input to activate the PDTS. In an illustrative example, at sub-block 308, the user input received by the UE 102 may correspond to at least one of navigating a browser to a site (e.g., the URL 114 of the PDTS portal depicted in FIG. 1) or launching an application (e.g., the PDTS application depicted in FIG. 1), and, at sub-block 310, the UE 102 may determine that a URSP rule of an existing (first) set of URSP rules stored in memory of the UE 102 specifies an ID of at least one of the site or the application.

If no such user input is received at block 304, the process 300 may follow the NO route from block 304 to block 312 where, during a PDU session 202(A), the UE 102 may send, based at least in part on a default URSP rule of the existing (first) set of URSP rules stored in the memory of the UE 102, one or more data packets via the first (non-priority) network slice 200(A), and the process 300 may return to block 304 to continue monitoring for user-activation of the PDTS. If, at block 304, the UE 102 receives user input to activate the PDTS, the UE 102 may send a PDU session establishment request for a priority network slice, such as S-NSSAI$_{PDTS}$ or S-NSSAI$_{PDTS-nonsub}$, and the process 300 may follow the YES route from block 304 to block 314.

At 314, the UE 102 may receive, based at least in part on the user input received at block 306 and based at least in part on the PDU session establishment request sent by the UE 102 for the priority network slice, a second set of URSP rules 112 (e.g., to replace the first set of URSP rules in the memory of the UE 102). The second set of URSP rules 112 may include a default URSP rule that causes the UE 102 to send data packets during a PDU session via a priority network slice, such as the PDTS network slice. In the case of a WPS UE 102(1), the UE 102(1) already registered for this PDTS network slice 200(B) at block 302. In the case of a generic UE 102(2), the UE 102(2) registered for the PDTS non-subscriber network slice at block 302, and subsequently, upon successful authentication of the GETS user 104(2) of the UE 102(2), the UE 102(2) may be authorized (e.g., through backend procedures) to send data packets via a third (PDTS) network slice 200(B).

At 316, the UE 102 may determine whether the user 104 has requested to deactivate the PDTS. For example, at sub-block 306, the UE 102 may determine whether it has received user input to deactivate the PDTS. The UE 102 may monitor for the same, or similar, type of user input as it did for activating the PDTS. For instance, at sub-block 308, the user input received by the UE 102 may correspond to at least one of navigating a browser to a site (e.g., the URL 114 of the PDTS portal depicted in FIG. 1) or launching an application (e.g., the PDTS application depicted in FIG. 1), and, at sub-block 310, the UE 102 may determine that a URSP rule of the second set of URSP rules 112 received by the UE 102 at block 314 specifies an ID of at least one of the site or the application.

If no such user input is received at block 316, the process 300 may follow the NO route from block 316 to block 318 where, during a PDU session 202(B), the UE 102 may send, based at least in part on a default URSP rule of the second set of URSP rules 112 stored in the memory of the UE 102, one or more data packets via a priority network slice 200(B), and the process 300 may return to block 316 to continue monitoring for user-deactivation of the PDTS. Again, in an example where the UE 102 represents a WPS UE 102(1), the priority network slice 200(B) that is used for the PDU session 202(B) at block 318 may correspond to the second network slice 200(B) that the UE 102(1) registered for at block 302. In an example where the UE 102 represents a generic UE 102(2), the UE 102(2) may not have registered for this priority network slice 200(B) at block 302. Instead, the UE 102(2) may have registered for a second or intermediate (PDTS non-subscriber) network slice at block 302, and the UE 102(2) may have been authorized to use a third (PDTS) network slice 200(B) post registration, such as upon authentication of the GETS user 104(2) of the UE 102(2) following block 304. As shown by sub-block 320, the default URSP rule of the second set of URSP rules 112 received by the UE 102 may prevent data packets from being sent over Wi-Fi during the PDU session 202(B). If, at block 316, the UE 102 receives user input to deactivate the PDTS, the UE 102 may send a PDU session establishment request for slice S-NSSAI$_{PDTS\text{-}turn\text{-}off}$, and the process 300 may follow the YES route from block 316 to block 322.

At 322, the UE 102 may receive, based at least in part on the user input received at block 316, and based at least in part on the PDU session establishment request sent by the UE 102 for slice S-NSSAI$_{PDTS\text{-}turn\text{-}off}$, the original (first) set of URSP rules (e.g., to replace the second set of URSP rules 112 in the memory of the UE 102). If the original (first) set of URSP rules were retained in the memory of the UE 102, however, the UE 102 may not receive any new URSP rules, but may change a pointer to reference the original (first) set of URSP rules so that the original (first) set of URSP rules may be utilized going forward. The original (first) set of URSP rules may include the default URSP rule that causes the UE 102 to send data packets during a PDU session 202(A) via the first network slice 200(A), such as the eMBB network slice. Accordingly, the process 300 may return to block 304 from block 322, and, if the user 104 has not activated the PDTS, and if the user 104 accesses the Internet, the UE 102 may, at block 312, send, based at least in part on the default URSP rule of the original (first) set of URSP rules stored in the memory of the UE 102, one or more data packets during a PDU session 202(A) via the first (non-priority) network slice 200(A). In this manner, the user 104 may toggle the PDTS ON and OFF by iterating blocks of the process 300, thereby providing the user 104 with on-demand priority access to the Internet via a core network 106.

Figure 4:
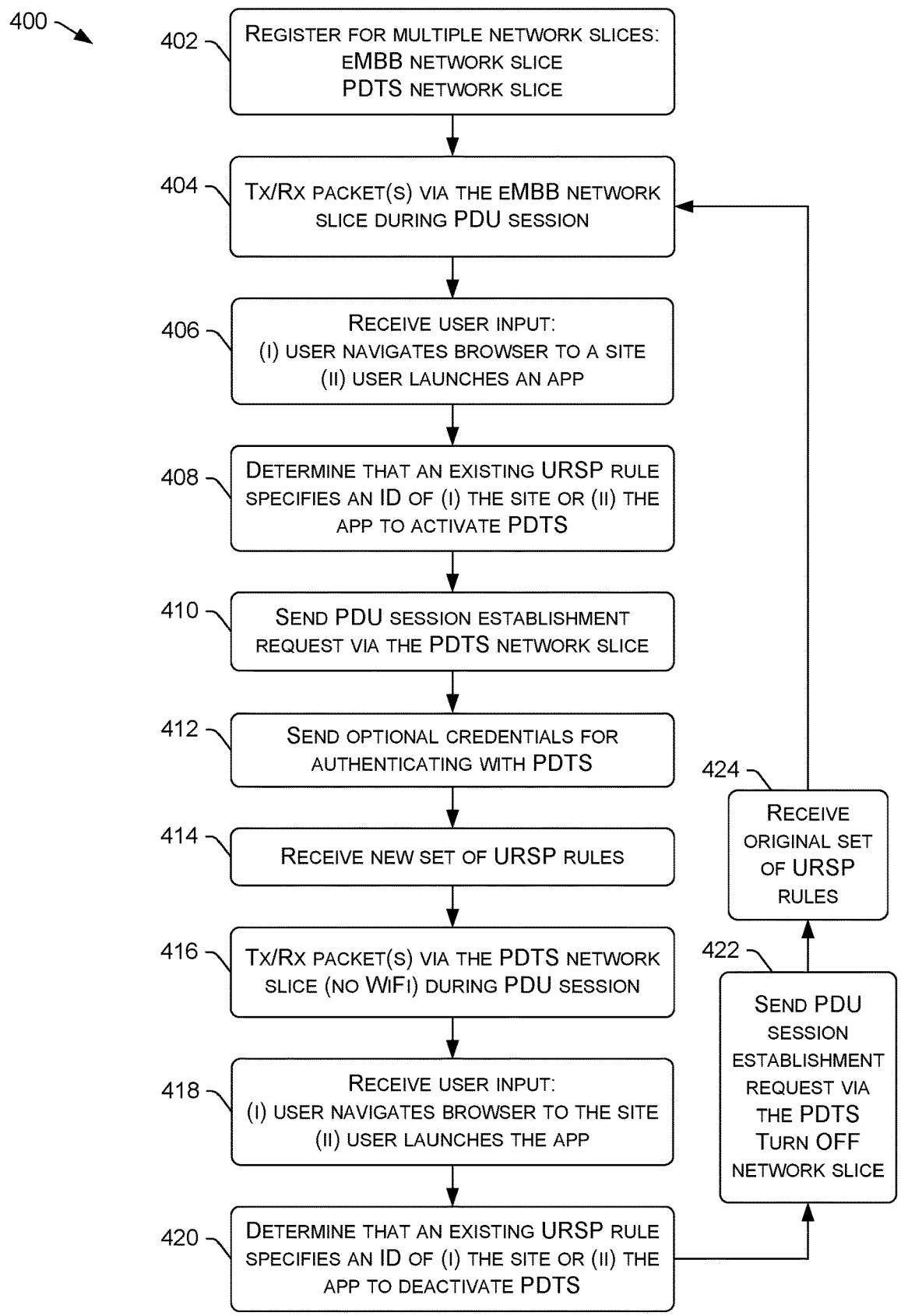
FIG. 4 illustrates a flowchart of an example process for activating, and subsequently deactivating, the PDTS for a WPS UE, according to various embodiments.

FIG. 4 illustrates a flowchart of an example process 400 for activating, and subsequently deactivating, the PDTS for a WPS UE 102(1). The WPS UE 102(1) is already subscribed to the PDTS. For example, a Subscriber Identity Module (SIM) card of the WPS UE 102(1) may be subscribed to a first (eMBB) network slice 200(A) and to a second (PDTS) network slice 200(B). Implementation of the process 400 assumes that (i) the UE's 102 subscription authentication (5G primary authentication) with the PDTS is allowed and/or (ii) using the 3GPP-defined secondary authentication via an authentication, authorization and accounting (AAA) server outside the 3GPP architecture is sufficient to establish PDTS authentication and authorization. The process 400 is described with reference to the previous figures.

At 402, the UE 102(1) may register with the core network 106 and request multiple network slices 200, such as a first (eMBB) network slice 200(A) and a second (PDTS) network slice 200(B), the second (PDTS) network slice 200(B) being usable by UEs 102 that are subscribed to the PDTS to activate and use the PDTS. The second (PDTS) network slice 200(B) is configured to provide higher priority transport of data packets during PDU sessions than the first (eMBB) network slice 200(A). In an illustrative example, the UE 102(1), at block 402, may include in the requested NSSAI: {S-NSSAI$_{PDTS}$, S-NSSAI$_{eMBB}$}. A network node(s) may confirm that the UE's 102(1) subscription has PDTS slice support, and, if so, may return, to the UE 102(1), an Allowed NSSAI set that includes the PDTS network slice 200(B) and other network slices. For example, Allowed NSSAI may include: {S-NSSAI$_{PDTS}$, S-NSSAI$_{eMBB}$}. This confirmation obtained by the network node(s) provides a first level check for PDTS service. The UE 102(1) may be considered "registered" for the multiple network slices 200 at block 402, but neither network slice 200 is activated until a PDU session is established.

At 404, the UE 102(1) may send (and receive) one or more data packets during a PDU session 202(A) via the first (eMBB) network slice 200(A). By default, the UE 102(1) may have configured (e.g., stored in local memory of the UE 102(1)) a set of URSP rules that may include, without limitation, a default rule that directs traffic (e.g., all traffic) to the first (eMBB) network slice 200(A), and a URSP rule at the highest precedence with S-NSSAI$_{PDTS}$, and optionally, a specific DNN$_{PDTS}$ and perhaps other parameters and traffic description matching: (i) the PDTS portal address or FQDN, or (ii) an app ID for a PDTS app on the UE 102(1). Accordingly, based on the default URSP rule, whenever the user 104(1) provides user input to the UE 102(1) causing the UE 102(1) to send data, the UE 102(1) establishes a PDU session 202(A) using S-NSSAI$_{eMBB}$ for regular Internet access. This might include other PDU session parameters such as DNN$_{eMBB}$. Internet traffic (e.g., all Internet traffic) runs over the PDU session 202(A) using the first (eMBB) network slice 200(A) (i.e., S-NSSAI$_{eMBB}$). The UE 102(1) might also have other PDU sessions 202 for other uses.

At 406, the UE 102(1) may receive user input to activate the PDTS. In some examples, the user input received at block 406 may correspond to navigating a browser to a site (e.g., the user entering a URL 114 of the PDTS portal into a web browser, as depicted in FIG. 1). In some examples, the user input received at block 406 may correspond to launching an application (e.g., the PDTS app depicted in FIG. 1).

At 408, the UE 102(1) may determine that a URSP rule of the existing (first) set of URSP rules specifies an ID (e.g., an address, FQDN, etc.) of the site to which the user 104(1) pointed the browser, or an ID (e.g., app ID) of the application launched by the user 104(1). This ID match at block 408 may indicate that the user 104(1) wishes to activate the PDTS on demand.

At 410, the URSP rule that specifies the ID of the site or the app at block 408 may trigger the UE 102(1) to send a PDU session establishment request for the second (PDTS) network slice 200(B) (e.g., S-NSSAI$_{PDTS}$). In some examples, the PDU session establishment request may include a specific DNN$_{PDTS}$ and perhaps other parameters. The second (PDTS) network slice 200(B) is a priority network slice. On the network side, in response to the UE 102(1) sending the PDU session establishment request, an AMF may select an appropriate SMF for this new priority PDU session. The selected SMF may perform a PDU session establishment by contacting the PCF for authorization. The contacted PCF may instruct traffic (e.g., all traffic) for this PDU session to be treated with higher priority compared to regular Internet access, thereby reducing the risk of preemption during a period of traffic congestion. The PCF supports adjusting QoS parameters for priority and allocation and retention priority (ARP), as per standards for priority data service.

At 412, the UE 102(1) may send credentials for authenticating with the PDTS. The authenticating referenced at block 412 is sometimes referred to herein as "secondary slice authentication," and it is optional for a WPS UE 102(1). Secondary slice authentication may run extensible authentication protocol (EAP) between the UE 102(1) and an AAA server, as per standard. The AAA server may be operated by the mobile operator on behalf of an authenticating agency, or the AAA server may be operated by the authenticating agency and may perform an authentication dedicated to the PDTS. This secondary AAA server provides an additional check that the UE 102(1) identity is valid and authorized for the PDTS through a set of credentials dedicated to the PDTS that are already provisioned on the UE 102(1). Accordingly, these credentials may be sent by the UE 102(1) at block 412 as part of this secondary slice authentication.

At 414, the PCF may initiate a UE configuration update to replace the existing URSP rules in the UE 102(1) with a new (second) set of URSP rules 112(1), and the UE 102(1) may, therefore, receive the second set of URSP rules 112(1) to replace the existing (first) set of URSP rules in the memory of the UE 102(1). The second set of URSP rules 112(1) may include a (default) URSP rule that causes the UE 102(1) to send data packets during a PDU session 202(B) via the second (PDTS) network slice 200(B). For example, the (default) URSP rule may direct traffic (e.g., all traffic) to the second (PDTS) network slice 200(B) and PDU session 202(B). This may include preferred access set to 5G, which prevents data over WiFi. For example, the (default) URSP rule of the second set of URSP rules 112(1) may prevent data packets from being sent over Wi-Fi during the PDU session 202(B). The second set of URSP rules 112(1) may further include URSP rule at the highest precedence with S-NSSAI$_{PDTS\text{-}turn\text{-}off}$, and optionally, a specific DNN$_{PDTS\text{-}turn\text{-}off}$ and perhaps other parameters and traffic description matching: (i) the PDTS portal address or FQDN, or (ii) an app ID for a PDTS app on the UE 102(1). In some examples, the first PDU session 202(A) may be maintained (e.g., with no traffic). In other examples, the first PDU session 202(A) may be torn down.

At 416, the UE 102(1) may send (and receive) one or more data packets during a PDU session 202(B) via the second (PDTS) network slice 200(B). That is, if the user 104(1) provides user input to access the Internet, for example, the UE 102(1) may utilize the second (PDTS) network slice 200(B) based on the (default) URSP rule of the second set of URSP rules 112(1) received by the UE 102(1) at block 414. Accordingly, Internet traffic (e.g., all Internet traffic) runs over the PDU session 202(B) using the second (PDTS) network slice 200(B) (e.g., slice S-NSSAI$_{PDTS}$). The settings of this PDU session 202(B) may be such that traffic (e.g., all traffic) is sent over a QoS enabled flow with high priority across both the RAN network and the core network 106.

At 418, the UE 102(1) may receive second user input to deactivate the PDTS. In some examples, the user input received at block 418 may correspond to navigating a browser to a site (e.g., the user entering the URL 114 of the PDTS portal into a web browser). In some examples, the user input received at block 418 may correspond to launching an application (e.g., the PDTS app depicted in FIG. 1).

At 420, the UE 102(1) may determine that a URSP rule of the received (second) set of URSP rules 112(1) specifies an ID (e.g., an address, FQDN, etc.) of the site to which the user 104(1) pointed the browser, or an ID (e.g., app ID) of the application launched by the user 104(1). This ID match at block 420 may indicate that the user 104(1) wishes to deactivate the PDTS on demand.

At 422, the URSP rule (of the second set of URSP rules 112(1)) at the highest precedence with S-NSSAI$_{PDTS\text{-}turn\text{-}off}$ may trigger the UE 102(1) to send a PDU session establishment request for slice S-NSSAI$_{PDTS\text{-}turn\text{-}off}$ with optionally, a specific DNN$_{PDTS\text{-}turn\text{-}off}$ and perhaps other parameters. The network slice for S-NSSAI$_{PDTS\text{-}turn\text{-}off}$ may be functionally equivalent to the second (PDTS) network slice 200(B) (e.g., S-NSSAI$_{PDTS}$), but the network slice for S-NSSAI$_{PDTS\text{-}turn\text{-}off}$ may be associated with a different S-NSSAI value than the second (PDTS) network slice 200(B). On the network side, the PDU session establishment request sent at block 422 may trigger the AMF to select the same SMF for this new PDU session 200(A) as the current SMF. The SMF may perform a PDU session establishment by contacting the PCF for authorization. The PCF may approve the PDU session establishment (to allow some user interaction at the portal, such as a logoff confirmation). However, based on the PDTS-turn-off session slice, the PCF may initiate a UE configuration update to replace the existing (second) set of URSP rules 112(1) in the UE 102(1) with the original (first) set of URSP rules before PDTS service activation.

Accordingly, at 424, based on the UE configuration update initiated by the PCF, the UE 102(1) may receive the original (first) set of URSP rules to replace the second set of URSP rules 112(1) in the memory of the UE 102(1). As shown in FIG. 4, the process 400 may return to block 404 following block 424 to iterate blocks 404-424 as the user 104(1) toggles the PDTS ON and OFF, in an on demand fashion. In other words, following block 424, the UE 102(1) may, at block 404, send (and receive) one or more data packets during a PDU session 202(A) via the first (eMBB) network slice 200(A) (e.g., S-NSSAI$_{eMBB}$). That is, if the user 104(1) provides user input to access the Internet, for example, the UE 102(1) may utilize the first (eMBB) network slice 200(A) based on the (default) URSP rule of the original (first) set of URSP rules received by the UE 102(1) at block 424. For example, the (default) URSP rule of the original (first) set of URSP rules may trigger the UE 102(1) to send a PDU session establishment request for the first (eMBB) network slice 200(A) (e.g., S-NSSAI$_{eMBB}$) for regular Internet access per the updated URSP rules, where Internet traffic (e.g., all Internet traffic) runs over the PDU session 202(A) using the first (eMBB) network slice 200(A) (e.g., S-NSSAI$_{eMBB}$). If the previous PDU session 202(A) was not torn down, the UE 102(1) may send traffic over the first (eMBB) network slice 200(A), and the UE 102(1) may refrain from establishing a new PDU session, in this example. The PCF may provide the SMF with the original set of policy and charging control (PCC) rules for various QoS flows to be used by the UE 102(1) for non-priority services. It is to be appreciated, however, that the UE 102(1) may have other PDU sessions 202 for other uses. Furthermore, any traffic routing instructions for these PDU sessions 202 may be restored to their original state before the PDTS activation.

Figure 5:
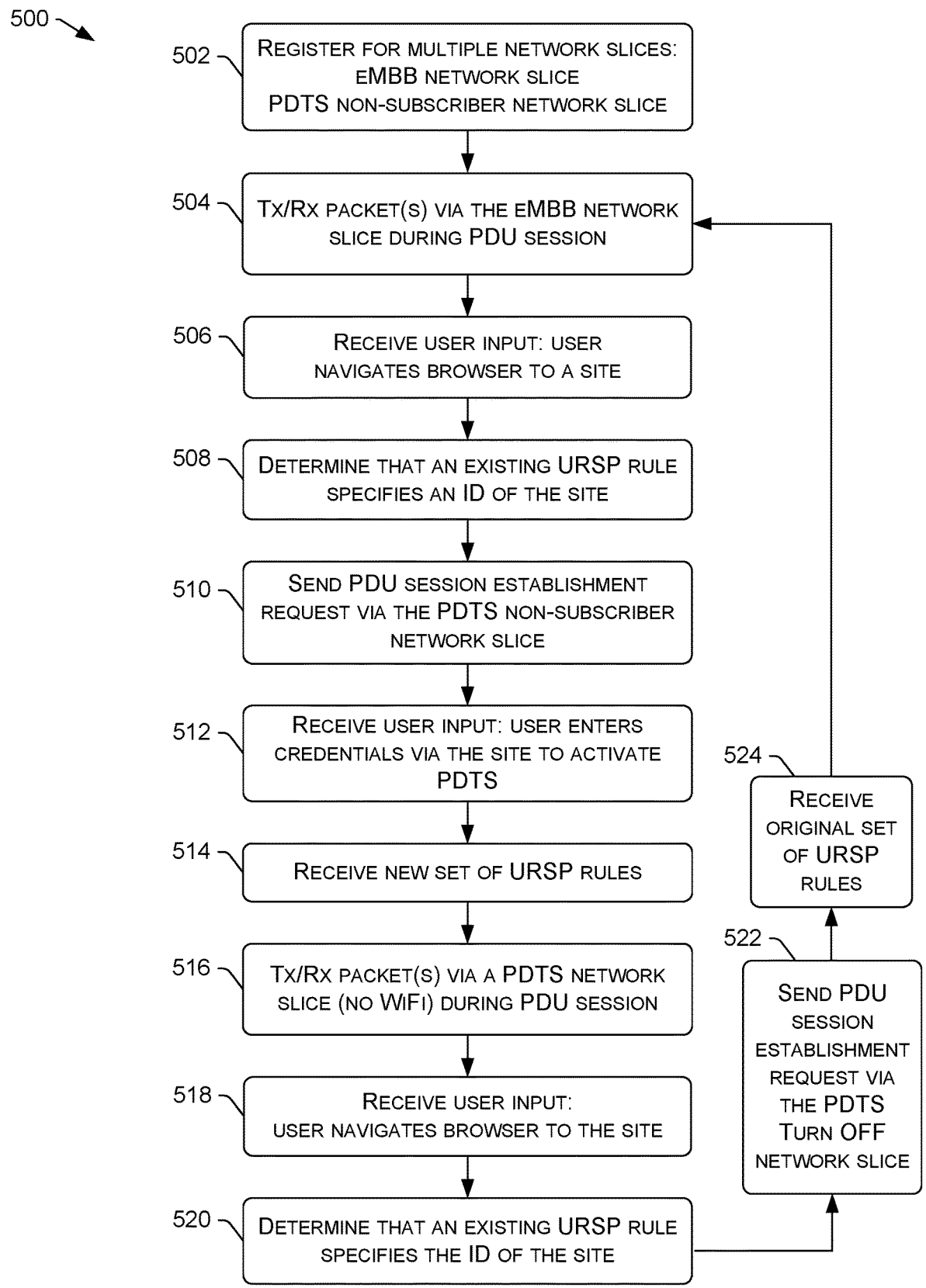
FIG. 5 illustrates a flowchart of an example process for activating, and subsequently deactivating, the PDTS for any UE (e.g., a non-WPS UE), according to various embodiments.

FIG. 5 illustrates a flowchart of an example process 500 for activating, and subsequently deactivating, the PDTS for any UE 102 (e.g., a non-WPS UE 102(2)). The non-WPS UE 102(2) is not subscribed to the PDTS. Implementation of the process 500 assumes that any UE 102 has the potential to activate the PDTS, but that UEs 102 are not allowed to activate the PDTS in instances where users 104(2) of the UEs 102 cannot be authorized through a web service/web server. The process 500 supports the GETS, where a PDTS user can use or borrow any UE 102 to activate and use the PDTS (including their own UE 102). The process 500 is described with reference to the previous figures.

At 502, the UE 102(2) may register with the core network 106 and request multiple network slices 200, such as a first (eMBB) network slice 200(A) and a second (PDTS non-subscriber) network slice, the second (PDTS non-subscriber) network slice being usable by UEs 102 that are not subscribed to the PDTS to activate the PDTS. The second (PDTS non-subscriber) network slice is configured to provide higher priority transport of data packets during PDU sessions than the first (eMBB) network slice 200(A). In an illustrative example, the UE 102(2), at block 502, may include in the requested NSSAI: {S-NSSAI$_{PDTS-nonsub}$, S-NSSAI$_{eMBB}$}. The non-WPS (or PDTS non-subscriber) UE 102(2) is allowed to register for network slice S-NSSAI$_{PDTS-nonsub}$, but the UE 102(2) may not be able to register for network slice S-NSSAI$_{PDTS}$ because it does not have a PDTS subscription. The UE 102(2) may be considered "registered" for the multiple network slices 200 at block 502, but neither network slice 200 is activated until a PDU session is established.

At 504, the UE 102(2) may send (and receive) one or more data packets during a PDU session 202(A) via the first (eMBB) network slice 200(A). By default, the UE 102(2) may have configured (e.g., stored in local memory of the UE 102(2)) a set of URSP rules that may include, without limitation, a default rule that directs traffic (e.g., all traffic) to the first (eMBB) network slice 200(A), and a URSP rule at the highest precedence with S-NSSAI$_{PDTS-nonsub}$, and optionally, a specific DNN$_{PDTS-nonsub}$ and perhaps other parameters and traffic description matching the PDTS portal address or FQDN. Accordingly, based on the default URSP rule, whenever the user 104(2) provides user input to the UE 102(2) causing the UE 102(2) to send data, the UE 102(2) establishes a PDU session 202(A) using S-NSSAI$_{eMBB}$ for regular Internet access. This might include other PDU session parameters such as DNN$_{eMBB}$. Internet traffic (e.g., all Internet traffic) runs over the PDU session 202(A) using the first (eMBB) network slice 200(A) (i.e., S-NSSAI$_{eMBB}$). The UE 102(2) might also have other PDU sessions 202 for other uses.

At 506, the UE 102(2) may receive user input to activate the PDTS. In some examples, the user input received at block 506 may correspond to navigating a browser to a site (e.g., the user entering a URL 114 of the PDTS portal into a web browser, as depicted in FIG. 1).

At 508, the UE 102(2) may determine that a URSP rule of the existing (first) set of URSP rules specifies an ID (e.g., an address, FQDN, etc.) of the site to which the user 104(2) pointed the browser. This ID match at block 508 may indicate that the user 104(2) wishes to activate the PDTS on demand. In this scenario, the user 104(2) may represent a GETS user 104(2) who may have borrowed the UE 102(2) from someone else (e.g., a bystander in a public place).

At 510, the URSP rule that specifies the ID of the site at block 508 may trigger the UE 102(2) to send a PDU session establishment request for the second (PDTS non-subscriber) network slice (e.g., S-NSSAI$_{PDTS-nonsub}$). In some examples, the PDU session establishment request may include a specific DNN$_{PDTS-nonsub}$ and perhaps other parameters. The second (PDTS non-subscriber) network slice is a priority network slice for non-subscribers of the PDTS. On the network side, in response to the UE 102(2) sending the PDU session establishment request, an AMF may select an appropriate SMF for this new priority PDU session. The selected SMF may perform a PDU session establishment by contacting the PCF for authorization. The contacted PCF may instruct traffic (e.g., all traffic) for this intermediate PDU session to be treated with higher priority compared to regular Internet access, but traffic associated with the intermediate PDU session may be limited to that which is destined for the PDTS portal address (other traffic not destined for the PDTS portal address may still flow on the normal PDU session 202(A)).

At 512, the UE 102(2) may receive, during the intermediate PDU session, second user input corresponding to credentials 116 entered by a user 104(2) of the UE 102(2) via the site for authenticating with the PDTS. For example, the GETS user 104(2) may authenticate at the PDTS portal by entering credentials 116 (e.g., username and/or password). This authentication exchange may be carried over the intermediate PDU session with priority. If authentication is unsuccessful at block 512, the intermediate (priority) PDU session may be torn down and no further action is taken. If authentication is successful at block 512, the PDTS portal may act as an Application Function (AF) and use 3GPP 5G Standardized Application Function influence on traffic routing mechanism to deliver priority service policy to the PCF. The PDTS portal may directly contact a Network Exposure Function gateway, or it may utilize an intermediate server that performs the AF Influence mechanism on behalf of the PDTS portal. The PDTS portal may identify the serving UE 102(2) using an IP address of the UE 102(2). The AF-Service-Identifier may be based on the GETS user's 104(2) username/ID. Based on the received priority service policy based on the authenticated GETS user 104(2) and internal configuration, the PCF may update access policy to the AMF to include a third (PDTS) network slice 200(B), S-NSSAI$_{PDTS}$ (even though the UE 102(2) itself has no subscription to the PDTS). The PCF may instruct the SMF to tear down the intermediate PDU session.

At 514, the PCF may initiate a UE configuration update to replace the existing URSP rules in the UE 102(2) with a new (second) set of URSP rules 112(2), and the UE 102(2) may, therefore, receive the second set of URSP rules 112(2) to replace the existing (first) set of URSP rules in the memory of the UE 102(2). The second set of URSP rules 112(2) may include a (default) URSP rule that causes the UE 102(2) to send data packets during a PDU session 202(B) via the third (PDTS) network slice 200(B). For example, the (default) URSP rule may direct traffic (e.g., all traffic) to the third (PDTS) network slice 200(B) and PDU session 202(B), and optionally may include, a specific DNN$_{PDTS}$ and perhaps other parameters. This may include preferred access set to 5G, which prevents data over WiFi. For example, the (default) URSP rule of the second set of URSP rules 112(2) may prevent data packets from being sent over Wi-Fi during the PDU session 202(B). The second set of URSP rules 112(2) may further include URSP rule at the highest precedence with S-NSSAI$_{PDTS-turn-off}$, and optionally, a specific DNN$_{PDTS-turn-off}$ and perhaps other parameters and traffic description matching the PDTS portal address or FQDN. In some examples, the first PDU session 202(A) may be maintained (e.g., with no traffic). In other examples, the first PDU session 202(A) may be torn down.

At 516, the UE 102(2) may send (and receive) one or more data packets during a PDU session 202(B) via the third (PDTS) network slice 200(B). That is, if the user 104(2) provides user input to access the Internet, for example, the UE 102(2) may utilize the third (PDTS) network slice 200(B) based on the (default) URSP rule of the second set of URSP rules 112(2) received by the UE 102(2) at block 514. In some examples, the UE 102(2) may send, at block 516, a PDU session establishment request for slice S-NSSAI$_{PDTS}$ with optionally, a specific DNN$_{PDTS}$ and perhaps other parameters. The PDU session establishment results in a new PDU session 202(B) in the third (PDTS) network slice 200(B) to be established by SMF. Based on the received priority policy from the PDTS portal and internal configuration, the PCF may instruct traffic (e.g., all traffic) for this new PDU session 202(B) to be treated with higher priority compared to regular Internet access, thereby reducing the risk of pre-emption during a period of traffic congestion. This includes adjusting QoS parameters for priority and ARP as per standards for priority data service. Accordingly, Internet traffic (e.g., all Internet traffic) runs over the PDU session 202(B) using the third (PDTS) network slice 200(B) (e.g., slice S-NSSAI$_{PDTS}$). The settings of this PDU session 202(B) may be such that traffic (e.g., all traffic) is sent over a QoS enabled flow with high priority across both the RAN network and the core network 106.

At 518, the UE 102(2) may receive second user input to deactivate the PDTS. In some examples, the user input received at block 518 may correspond to navigating a browser to a site (e.g., the user entering the URL 114 of the PDTS portal into a web browser). The user 104(2) may not enter anything into the portal to deactivate the PDTS (e.g., navigating the browser to the site may be sufficient for deactivation of the PDTS).

At 520, the UE 102(2) may determine that a URSP rule of the received (second) set of URSP rules 112(2) specifies an ID (e.g., an address, FQDN, etc.) of the site to which the user 104(1) pointed the browser. This ID match at block 520 may indicate that the user 104(2) wishes to deactivate the PDTS on demand.

At 522, the URSP rule (of the second set of URSP rules 112(2)) at the highest precedence with S-NSSAI$_{PDTS-turn-off}$ may trigger the UE 102(2) to send a PDU session establishment request for slice S-NSSAI$_{PDTS-turn-off}$ with optionally, a specific DNN$_{PDTS-turn-off}$ and perhaps other parameters. On the network side, the PDU session establishment request sent at block 522 may trigger the AMF to select the same SMF for this new PDU session 200(A) as the current SMF. The SMF may perform a PDU session establishment by contacting the PCF for authorization. The PCF may approve the PDU session establishment (to allow some user interaction at the portal, such as a logoff confirmation). However, based on the PDTS-turn-off session slice, the PCF may initiate a UE configuration update to replace the existing (second) set of URSP rules 112(2) in the UE 102(2) with the original (first) set of URSP rules before PDTS service activation.

Accordingly, at 524, based on the UE configuration update initiated by the PCF, the UE 102(2) may receive the original (first) set of URSP rules to replace the second set of URSP rules 112(2) in the memory of the UE 102(2). As shown in FIG. 5, the process 500 may return to block 504 following block 524 to iterate blocks 504-524 as the user 104(2) toggles the PDTS ON and OFF, in an on demand fashion. In other words, following block 524, the UE 102(2) may, at block 504, send (and receive) one or more data packets during a PDU session 202(A) via the first (eMBB) network slice 200(A) (e.g., S-NSSAI$_{eMBB}$). That is, if the user 104(2) provides user input to access the Internet, for example, the UE 102(2) may utilize the first (eMBB) network slice 200(A) based on the (default) URSP rule of the original (first) set of URSP rules received by the UE 102(2) at block 524. For example, the (default) URSP rule of the original (first) set of URSP rules may trigger the UE 102(2) to send a PDU session establishment request for the first (eMBB) network slice 200(A) (e.g., S-NSSAI$_{eMBB}$) for regular Internet access per the updated URSP rules, where Internet traffic (e.g., all Internet traffic) runs over the PDU session 202(A) using the first (eMBB) network slice 200(A) (e.g., S-NSSAI$_{eMBB}$). If the previous PDU session 202(A) was not torn down, the UE 102(1) may send traffic over the first (eMBB) network slice 200(A), and the UE 102(1) may refrain from establishing a new PDU session, in this example. The PCF may provide the SMF with the original set of PCC rules for various QoS flows to be used by the UE 102(2) for non-priority services. It is to be appreciated, however, that the UE 102(2) may have other PDU sessions 202 for other uses. Furthermore, any traffic routing instructions for these PDU sessions 202 may be restored to their original state before the PDTS activation.

Figure 6A:
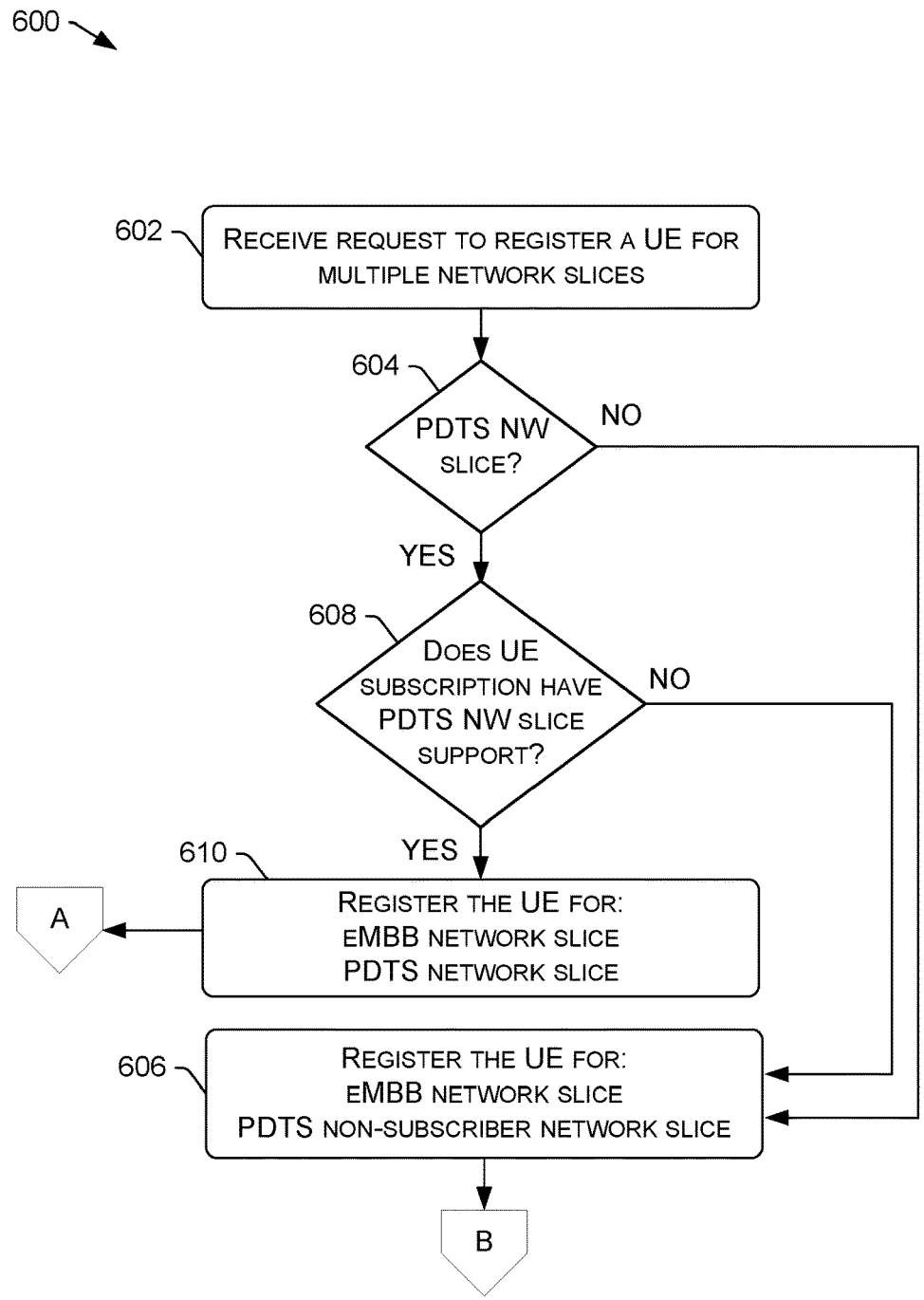
FIGS. 6A-6C illustrate a flowchart of an example process to be implemented by a network node(s) for activating the PDTS for a UE, according to various embodiments.
Figure 6B:
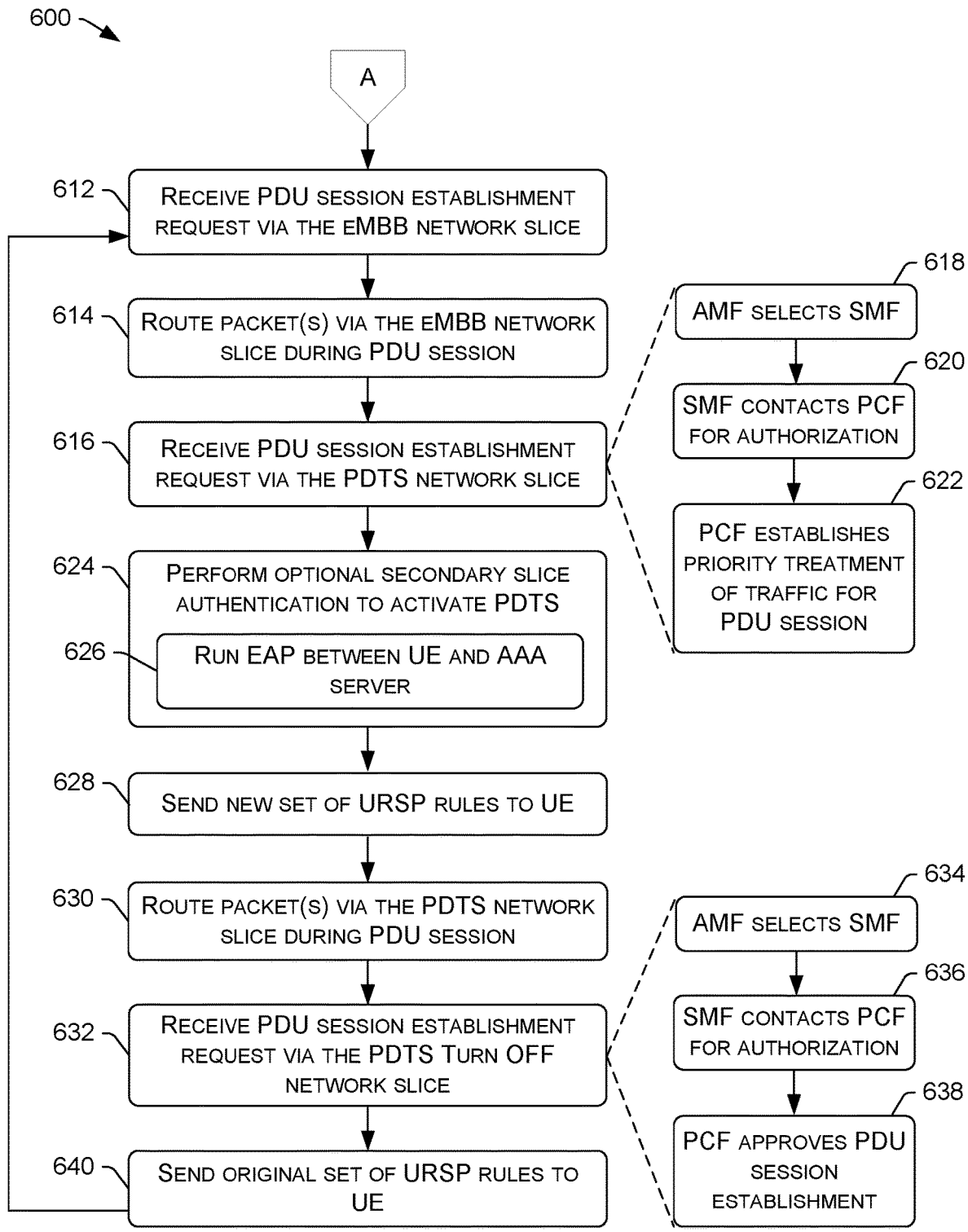
Figure 6C:
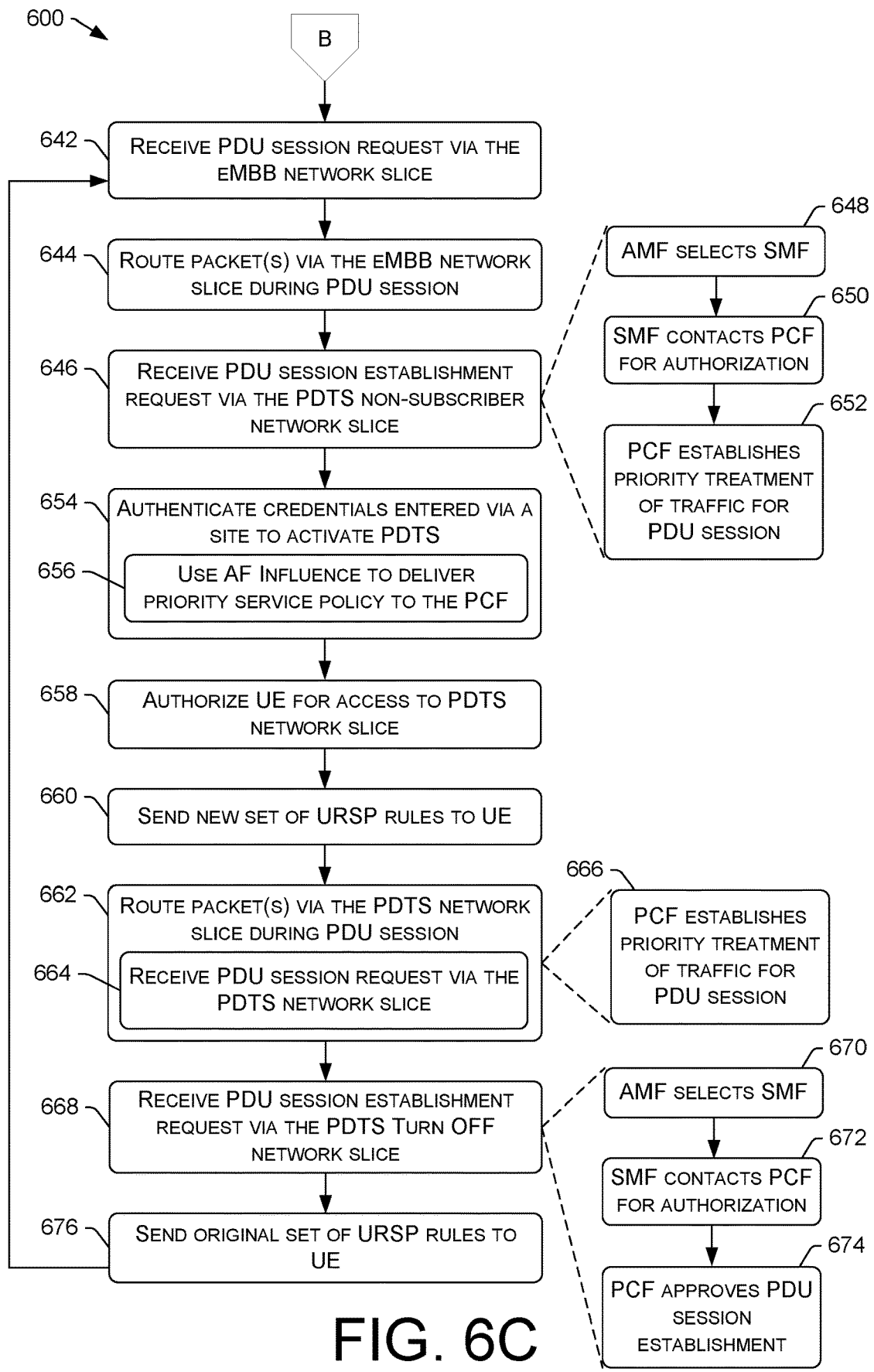

FIGS. 6A-6C illustrate a flowchart of an example process 600 to be implemented by a network node(s) for activating the PDTS for a UE 102, according to various embodiments. The process 600 is described with reference to the previous figures.

At 602 of FIG. 6A, a network node of a telecommunication network may receive, from a UE 102, a request to register the UE for multiple network slices 200. In an illustrative example, the network node may receive in the requested NSSAI: {S-NSSAI$_{PDTS}$, S-NSSAI$_{eMBB}$} or {S-NSSAI$_{PDTS-nonsub}$, S-NSSAI$_{eMBB}$}.

At 604, the network node may determine whether one of the multiple network slices 200 is a PDTS network slice 200(B) (e.g., S-NSSAI$_{PDTS}$). If the PDTS network slice 200(B) is not included in the registration request (e.g., if the network node receives in the requested NSSAI: {S-NSSAI$_{PDTS-nonsub}$, S-NSSAI$_{eMBB}$}), the process 600 may follow the NO route from block 604 to block 606, where the network node (or a different network node of the telecommunication network) may register the UE 102 for the requested network slices 200, which may include a first (eMBB) network slice 200(A) and a second (PDTS non-subscriber) network slice, the second (PDTS non-subscriber) network slice being usable by UEs 102 that are not subscribed to the PDTS to activate the PDTS.

If, at 604, the PDTS network slice 200(B) is included in the registration request (e.g., if the network node receives in the requested NSSAI: {S-NSSAI$_{PDTS}$, S-NSSAI$_{eMBB}$}), the process 600 may follow the YES route from block 604 to block 608, where the network node (or a different network node of the telecommunication network) may determine whether the UE's 102 subscription has PDTS network slice support.

At 608, if the network node determines that the UE's 102 subscription does not have PDTS network slice support, the process 600 may follow the NO route from block 608 to block 606, where the network node (or a different network node of the telecommunication network) may register the UE 102 for the first (eMBB) network slice 200(A) and a second (PDTS non-subscriber) network slice because the UE's 102 subscription does not have PDTS network slice support. At 608, if the network node determines that the UE's 102 subscription has PDTS network slice support, the process 600 may follow the YES route from block 608 to block 610, where the network node (or a different network node of the telecommunication network) may register the UE 102 for the requested network slices 200, which may include a first (eMBB) network slice 200(A) and a second (PDTS) network slice 200(B), the second (PDTS) network slice 200(B). For example, the network node may confirm that the UE's 102 subscription has PDTS slice support, and, if so, may return, to the UE 102, an Allowed NSSAI set that includes the PDTS network slice 200(B) and other network slices, such as the eMBB network slice 200(A). For example, Allowed NSSAI may include: {S-NSSAI$_{PDTS}$, S-NSSAI$_{eMBB}$}. This confirmation obtained by the network node(s) at block 608 provides a first level check for PDTS service. The UE 102 may be considered "registered" for the multiple network slices 200 at block 606 or 610, but an individual network slice 200 is not activated until a PDU session is established.

Turning to FIG. 6B, the process 600 may continue from block 610 of FIG. 6A, as indicated by the off-page reference "A" in FIGS. 6A and 6B. At 612, a network node may receive, from the UE 102, a PDU session establishment request via the first (eMBB) network slice 200(A). For example, the user 104 of the UE 102 may have provided user input to the UE 102 causing the UE 102 to send data, and the UE 102 may have sent the PDU session establishment request received at block 612 using S-NSSAI$_{eMBB}$ for regular Internet access. The request received at block 612 might include other PDU session parameters such as DNN$_{eMBB}$.

At 614, a network node may route one or more data packets associated with a PDU session 202(A) involving the UE 102 via the first (eMBB) network slice 200(A). Accordingly, Internet traffic (e.g., all Internet traffic) runs over the PDU session 202(A) using the first (eMBB) network slice 200(A) (i.e., S-NSSAI$_{eMBB}$).

At 616, a network node may receive, from the UE 102, a PDU session establishment request via the PDTS network slice 200(B) (e.g., S-NSSAI$_{PDTS}$). In some examples, the PDU session establishment request received at block 616 may include a specific DNN$_{PDTS}$ and perhaps other parameters. The PDTS network slice 200(B) is a priority network slice. In some examples, in response to receiving the PDU session establishment request at block 616, an AMF may select an appropriate SMF at block 618 for this new priority PDU session 202(B). The selected SMF may perform a PDU session establishment by contacting the PCF for authorization at block 620. The contacted PCF may, at block 622, instruct traffic (e.g., all traffic) for this PDU session 202(B) to be treated with higher priority compared to regular Internet access, thereby reducing the risk of pre-emption during a period of traffic congestion. The PCF supports adjusting QoS parameters for priority and ARP, as per standards for priority data service.

At 624, a network node may perform secondary slice authentication to activate the PDTS based on credentials received from the UE 102. As noted above, secondary slice authentication is optional and may be omitted from the process 600. The secondary slice authentication performed at block 624 may run EAP between the UE 102 and an AAA server, as indicated by sub-block 626. The AAA server may be operated by the mobile operator on behalf of an authenticating agency, or the AAA server may be operated by the authenticating agency and may perform an authentication dedicated to the PDTS. This secondary AAA server provides an additional check that the UE 102 identity is valid and authorized for the PDTS through a set of credentials dedicated to the PDTS that are already provisioned on the UE 102.

At 628, a network node (e.g., the PCF) may initiate a UE configuration update (e.g., to replace the existing URSP rules in the UE 102(1)) with a new (second) set of URSP rules 112(1), and the network node (e.g., the PCF) may, therefore, send (e.g., download) to the UE 102 a new (second) set of URSP rules 112(1) (e.g., to replace the existing (first) set of URSP rules in the memory of the UE 102). The second set of URSP rules 112(1) may include a (default) URSP rule that causes the UE 102 to send data packets during a PDU session 202(B) via the PDTS network slice 200(B). For example, the (default) URSP rule may direct traffic (e.g., all traffic) to the second (PDTS) network slice 200(B) and PDU session 202(B). This may include preferred access set to 5G, which prevents data over WiFi. For example, the (default) URSP rule of the second set of URSP rules 112(1) may prevent data packets from being sent over Wi-Fi during the PDU session 202(B). The second set of URSP rules 112(1) may further include URSP rule at the highest precedence with S-NSSAI$_{PDTS\text{-}turn\text{-}off}$, and optionally, a specific DNN$_{PDTS\text{-}turn\text{-}off}$ and perhaps other parameters and traffic description matching: (i) the PDTS portal address or FQDN, or (ii) an app ID for a PDTS app on the UE 102. In some examples, the first PDU session 202(A) may be maintained (e.g., with no traffic). In other examples, the first PDU session 202(A) may be torn down.

Accordingly, at 630, a network node may route one or more data packets associated with a PDU session 202(B) involving the UE 102 via the PDTS network slice 200(B). For example, if the user 104 of the UE 102 provides user input to access the Internet, the UE 102 may utilize the PDTS network slice 200(B) based on the (default) URSP rule of the second set of URSP rules 112(1) sent (e.g., downloaded) to the UE 102 at block 628. Accordingly, Internet traffic (e.g., all Internet traffic) runs over the PDU session 202(B) using the PDTS network slice 200(B) (e.g., slice S-NSSAI$_{PDTS}$). The settings of this PDU session 202(B) may be such that traffic (e.g., all traffic) is sent over a QoS enabled flow with high priority across both the RAN network and the core network 106.

At 632, a network node may receive, from the UE 102, a PDU session establishment request for slice S-NSSAI$_{PDTS\text{-}turn\text{-}off}$ with optionally, a specific DNN$_{PDTS\text{-}turn\text{-}off}$ and perhaps other parameters. As noted above, the network slice for S-NSSAI$_{PDTS\text{-}turn\text{-}off}$ may be functionally equivalent to the PDTS network slice 200(B) (e.g., S-NSSAI$_{PDTS}$), but the network slice for S-NSSAI$_{PDTS\text{-}turn\text{-}off}$ may be associated with a different S-NSSAI value than the PDTS network slice 200(B). The PDU session establishment request received at block 632 may trigger the AMF to select, at block 634 the same SMF for this new PDU session 200(A) as the current SMF. The SMF may perform a PDU session establishment by contacting the PCF for authorization at block 636. The PCF may, at block 638, approve the PDU session establishment (to allow some user interaction at the portal, such as a logoff confirmation).

At 640, based on the PDTS-turn-off session slice, a network node (e.g., the PCF) may initiate a UE configuration update (e.g., to replace the existing (second) set of URSP rules 112(1) in the UE 102 with the original (first) set of URSP rules that were used before PDTS service activation), and, therefore, the network node (e.g., the PCF via the AMF), at block 640, may send (e.g., download) to the UE 102 the original (first) set of URSP rules to replace the second set of URSP rules 112(1) in the memory of the UE 102. If the original (first) set of URSP rules were retained in the memory of the UE 102 at a time of downloading the second set of URSP rules 112(1), then the network node may not send the UE 102 any new URSP rules. As shown in FIG. 6B, the process 600 may return to block 612 following block 640 to iterate blocks 612-640 as the user 104 toggles the PDTS ON and OFF, in an on demand fashion. For example, the (default) URSP rule of the original (first) set of URSP rules may trigger the UE 102 to send, and the network node may therefore receive, a PDU session establishment request at block 612 for the first (eMBB) network slice 200(A) (e.g., S-NSSAI$_{eMBB}$) for regular Internet access per the updated URSP rules. At 614, Internet traffic (e.g., all Internet traffic) is routed over the PDU session 202(A) using the first (eMBB) network slice 200(A) (e.g., S-NSSAI$_{eMBB}$). It is to be appreciated that, if the previous PDU session 202(A) was not torn down, traffic may be routed over the first (eMBB) network slice 200(A), and the process 600 may proceed from block 640 directly to block 614, without establishing a new PDU session. Further, the PCF may provide the SMF with the original set of PCC rules for various QoS flows to be used by the UE 102 for non-priority services. It is to be appreciated, however, that the UE 102 may have other PDU sessions 202 for other uses. Furthermore, any traffic routing instructions for these PDU sessions 202 may be restored to their original state before the PDTS activation.

Turning to FIG. 6C, the process 600 may continue from block 606 of FIG. 6A, as indicated by the off-page reference "B" in FIGS. 6A and 6C. At 642, a network node may receive, from the UE 102, a PDU session establishment request via the first (eMBB) network slice 200(A). For example, the user 104 of the UE 102 may have provided user input to the UE 102 causing the UE 102 to send data, and the UE 102 may have sent the PDU session establishment request received at block 642 using S-NSSAI$_{eMBB}$ for regular Internet access. The request received at block 642 might include other PDU session parameters such as DNN$_{eMBB}$.

At 644, a network node may route one or more data packets associated with a PDU session 202(A) involving the UE 102 via the first (eMBB) network slice 200(A). Accordingly, Internet traffic (e.g., all Internet traffic) runs over the PDU session 202(A) using the first (eMBB) network slice 200(A) (i.e., S-NSSAI$_{eMBB}$).

At 646, a network node may receive, from the UE 102, a PDU session establishment request via the PDTS non-subscriber network slice (e.g., S-NSSAI$_{PDTS-nonsub}$). In some examples, the PDU session establishment request received at block 646 may include a specific DNN$_{PDTS-nonsub}$ and perhaps other parameters. The PDTS non-subscriber network slice is a priority network slice for non-subscribers of the PDTS. In some examples, receiving the PDU session establishment request at block 646, an AMF may select an appropriate SMF at block 648 for this new priority PDU session. The selected SMF may perform a PDU session establishment by contacting the PCF for authorization at block 650. The contacted PCF may, at block 652, instruct traffic (e.g., all traffic) for this intermediate PDU session to be treated with higher priority compared to regular Internet access, but traffic associated with the intermediate PDU session may be limited to that which is destined for the PDTS portal address (other traffic not destined for the PDTS portal address may still flow on the normal PDU session 202(A)).

At 654, a network node may authenticate credentials 116 entered by a user 104 of the UE 102 via the site (e.g., the PDTS portal) during the intermediate PDU session for authenticating with the PDTS. For example, the GETS user 104(2) may authenticate at the PDTS portal by entering credentials 116 (e.g., username and/or password). This authentication exchange may be carried over the intermediate PDU session with priority. If authentication is unsuccessful at block 654, the intermediate (priority) PDU session may be torn down and no further action is taken. If authentication is successful at block 654, the PDTS portal may, at sub-block 656, act as an AF and use 3GPP 5G Standardized Application Function influence on traffic routing mechanism to deliver priority service policy to the PCF. The PDTS portal may directly contact a Network Exposure Function gateway, or it may utilize an intermediate server that performs the AF Influence mechanism on behalf of the PDTS portal. The PDTS portal may identify the serving UE 102 using an IP address of the UE 102. The AF-Service-Identifier may be based on the GETS user's 104(2) username/ID.

At 658, based on the received priority service policy based on the authenticated GETS user 104(2) and internal configuration, the network node may authorize the UE 102 for access to the PDTS network slice 200(B). For example, the PCF may update access policy to the AMF to include a third (PDTS) network slice 200(B), S-NSSAI$_{PDTS}$ (even though the UE 102 itself has no subscription to the PDTS). The PCF may instruct the SMF to tear down the intermediate PDU session.

At 660, a network node (e.g., the PCF) may initiate a UE configuration update (e.g., to replace the existing URSP rules in the UE 102 with a new (second) set of URSP rules 112(2)), and the network node (e.g., the PCF) may, therefore, send (e.g., download) to the UE 102 the second set of URSP rules 112(2) to replace the existing (first) set of URSP rules in the memory of the UE 102. The second set of URSP rules 112(2) may include a (default) URSP rule that causes the UE 102 to send data packets during a PDU session 202(B) via the PDTS network slice 200(B). For example, the (default) URSP rule may direct traffic (e.g., all traffic) to the PDTS network slice 200(B) and PDU session 202(B), and optionally may include, a specific DNN$_{PDTS}$ and perhaps other parameters. This may include preferred access set to 5G, which prevents data over WiFi. For example, the (default) URSP rule of the second set of URSP rules 112(2) may prevent data packets from being sent over Wi-Fi during the PDU session 202(B). The second set of URSP rules 112(2) may further include URSP rule at the highest precedence with S-NSSAI$_{PDTS-turn-off}$ and optionally, a specific DNN$_{PDTS-turn-off}$ and perhaps other parameters and traffic description matching the PDTS portal address or FQDN. In some examples, the first PDU session 202(A) may be maintained (e.g., with no traffic). In other examples, the first PDU session 202(A) may be torn down.

At 662, a network node may route one or more data packets during a PDU session 202(B) via the third (PDTS) network slice 200(B). That is, if the user 104 provides user input to access the Internet, for example, the UE 102 may utilize the third (PDTS) network slice 200(B) based on the (default) URSP rule of the second set of URSP rules 112(2) sent (e.g., downloaded) to the UE 102 at block 660. In some examples, the network node may receive, at sub-block 664, a PDU session establishment request for slice S-NSSAI$_{PDTS}$ with optionally, a specific DNN$_{PDTS}$ and perhaps other parameters. The PDU session establishment results in a new PDU session 202(B) in the third (PDTS) network slice 200(B) to be established by SMF. Based on the received priority policy from the PDTS portal and internal configuration, the PCF may, at block 666, instruct traffic (e.g., all traffic) for this new PDU session 202(B) to be treated with higher priority compared to regular Internet access, thereby reducing the risk of pre-emption during a period of traffic congestion. This includes adjusting QoS parameters for priority and ARP as per standards for priority data service. Accordingly, Internet traffic (e.g., all Internet traffic) is routed over the PDU session 202(B) using the third (PDTS) network slice 200(B) (e.g., slice S-NSSAI$_{PDTS}$). The settings of this PDU session 202(B) may be such that traffic (e.g., all traffic) is sent over a QoS enabled flow with high priority across both the RAN network and the core network 106.

At 668, a network node may receive, from the UE 102, a PDU session establishment request for slice S-NSSAI$_{PDTS\text{-}turn\text{-}off}$ with optionally, a specific DNN$_{PDTS\text{-}turn\text{-}off}$ and perhaps other parameters. The PDU session establishment request received at block 668 may trigger the AMF to select, at block 670 the same SMF for this new PDU session 200(A) as the current SMF. The SMF may perform a PDU session establishment by contacting the PCF for authorization at block 672. The PCF may, at block 674, approve the PDU session establishment (to allow some user interaction at the portal, such as a logoff confirmation).

At 676, based on the PDTS-turn-off session slice, a network node (e.g., the PCF) may initiate a UE configuration update (e.g., to replace the existing (second) set of URSP rules 112(2) in the UE 102 with the original (first) set of URSP rules that were used before PDTS service activation), and, therefore, the network node (e.g., the PCF), at block 676, may send (e.g., download) to the UE 102 the original (first) set of URSP rules to replace the second set of URSP rules 112(2) in the memory of the UE 102. If the original (first) set of URSP rules were retained in the memory of the UE 102 at a time of downloading the second set of URSP rules 112(2), the network node may not send the UE 102 any new URSP rules. As shown in FIG. 6C, the process 600 may return to block 642 following block 676 to iterate blocks 642-676 as the user 104 toggles the PDTS ON and OFF, in an on demand fashion. For example, the (default) URSP rule of the original (first) set of URSP rules may trigger the UE 102 to send, and the network node may therefore receive, a PDU session establishment request at block 642 for the first (eMBB) network slice 200(A) (e.g., S-NSSAI$_{eMBB}$) for regular Internet access per the updated URSP rules. At 644, Internet traffic (e.g., all Internet traffic) is routed over the PDU session 202(A) using the first (eMBB) network slice 200(A) (e.g., S-NSSAI$_{eMBB}$). It is to be appreciated that, if the previous PDU session 202(A) was not torn down, traffic may be routed over the first (eMBB) network slice 200(A), and the process 600 may proceed from block 676 directly to block 644, without establishing a new PDU session. Further, the PCF may provide the SMF with the original set of PCC rules for various QoS flows to be used by the UE 102 for non-priority services. It is to be appreciated, however, that the UE 102 may have other PDU sessions 202 for other uses. Furthermore, any traffic routing instructions for these PDU sessions 202 may be restored to their original state before the PDTS activation.

Yet another example technique for implementing the PDTS is to use a third party (3P) Application Server, without network slicing and without URSP rules. This technique does not prioritize the initial period to establish PDTS user authorization and authentication, it offers a potentially stronger authentication mechanism than that which is available from AAA protocols, and it does not have URSP rules for PDTS network slices resident in the UE 102, which may mitigate some security threats/risks.

In this alternative technique for implementing the PDTS, a UE 102 may establish a PDU session 202(A) for regular Internet access, whereby Internet traffic runs over the PDU session 202(A) without priority. At some point, a (WPS/GETS) user 104 of the UE 102 wishes to activate the PDTS. The (WPS/GETS) user 104 may point a browser executing on the UE 102 at the PDTS portal address or FQDN, and the user 104 may authenticate at the PDTS portal (e.g., by entering credentials 116, such as a username and password). This authentication exchange is carried over the regular PDU session 202(A).

If authentication is unsuccessful, no further action is taken. Upon successful authentication, the portal acts as an AF and uses 3GPP 5G Standardized Application Function influence on traffic routing mechanism to deliver priority service policy to the PCF. The PDTS portal may directly contact a Network Exposure Function gateway or go through an intermediate server that performs the AF Influence mechanism on behalf of the PDTS portal. The PDTS portal may identify the serving UE 102 using its IP address. The AF-Service-Identifier may be based on the WPS/GETS user's 104 username/ID.

Based on the received priority service policy and internal configuration, the PCF may update the QoS parameters that apply to the general Internet PDU session 202(A). The SMF may receive updated PCC rules and take appropriate action (as per standards). Thereafter, traffic (e.g., all traffic) for this PDU session is treated with higher priority compared to regular Internet access, thereby reducing the risk of pre-emption during period of traffic congestion. Alternatively, another new PDU session 202(B) may be established with the proper QoS parameters and other PDU session parameters and the old PDU session 202(A) released. Again, traffic (e.g., all traffic) for this new PDU session 202(B) is treated with higher priority compared to regular Internet access, thereby reducing the risk of pre-emption during period of traffic congestion.

At some point, a (WPS/GETS) user 104 may wish to deactivate the PDTS. The (WPS/GETS) user 104 may point the browser at the PDTS portal address or FQDN. The (WPS/GETS) user 104 may indicate deactivation to the PDTS portal with little-to-no security. This exchange may be carried over the priority PDU session 202(B). The PDTS portal may act as an AF and use 3GPP 5G Standardized Application Function influence on traffic routing mechanism to deliver priority service policy to the PCF. The portal may directly contact a Network Exposure Function gateway or go through an intermediate server that performs the AF Influence mechanism on behalf of the PDTS portal. The PDTS portal may identify the serving UE 102 using its IP address. The AF-Service-Identifier may be based on the (WPS/GETS) user's 104 username/ID.

Based on the received service policy and internal configuration, the PCF may update the QoS parameters that apply to the general Internet PDU session 202(A). The SMF may receive updated PCC rules and take appropriate action (as per standards). Thereafter, traffic (e.g., all traffic) for this PDU session 202(A) is treated with normal priority. Alternatively, another new PDU session 202(A) may be established with the normal (non-priority) QoS parameters and other PDU session parameters, and the previous, priority PDU session 202(B) released.

Figure 7:
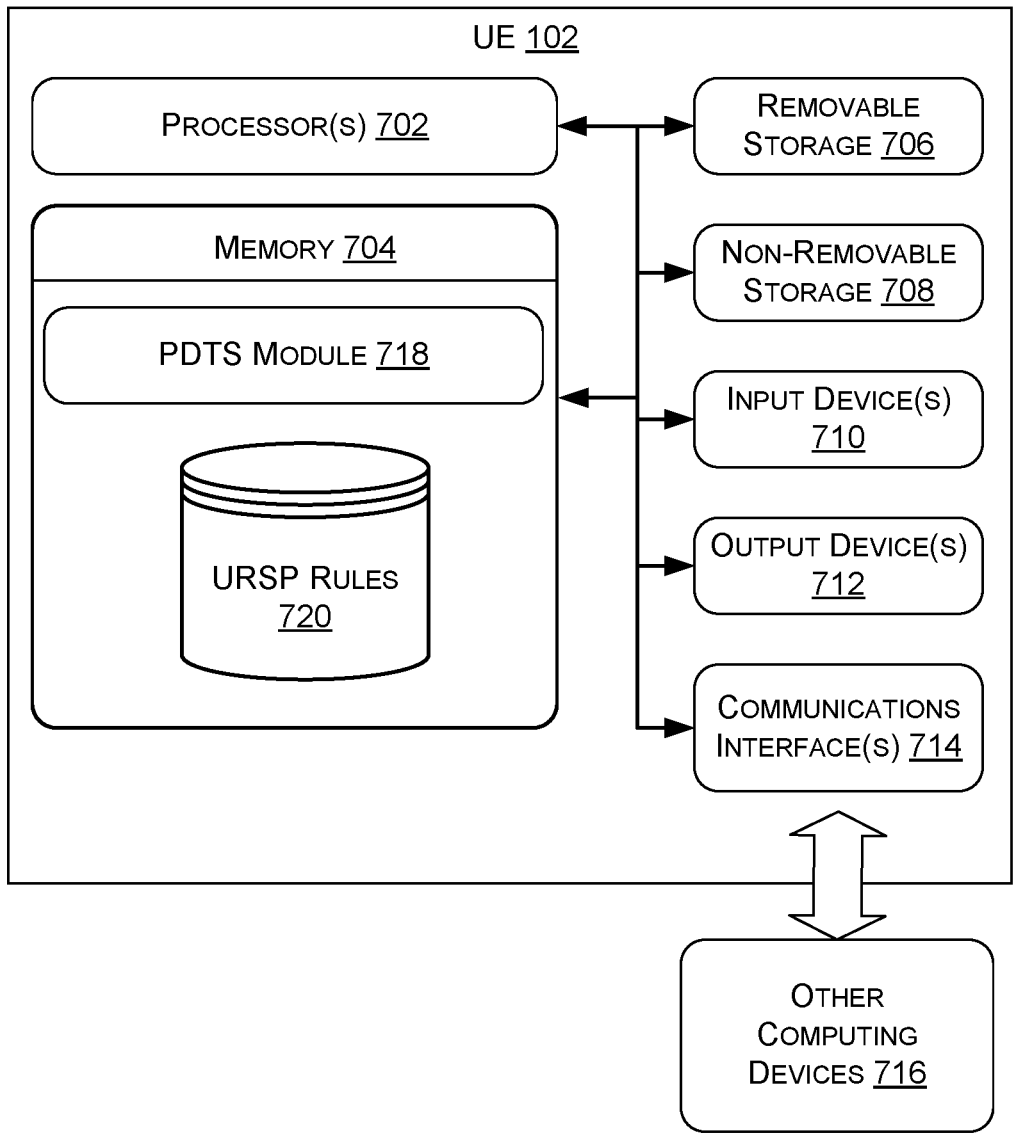
FIG. 7 is a block diagram of an example UE with logic to activate/deactivate the PDTS, according to various embodiments.

FIG. 7 is a block diagram of an example UE 102 with logic to activate/deactivate the PDTS, according to various embodiments. As shown, the UE 102 may include one or more processors 702 and one or more forms of computer-readable memory 704. The UE 102 may also include additional storage devices. Such additional storage may include removable storage 706 and/or non-removable storage 708.

The UE 102 may further include input devices 710 (e.g., a touch screen, keypad, keyboard, mouse, pointer, microphone, etc.) and output devices 712 (e.g., a display, printer, speaker, etc.) communicatively coupled to the processor(s) 702 and the computer-readable memory 704. The UE 102 may further include communications interface(s) 714 that allow the UE 102 to communicate with other computing devices 716 (e.g., network nodes, other UEs, etc.) such as via a network. The communications interface(s) 714 may facilitate transmitting and receiving wired and/or wireless signals over any suitable communications/data technology, standard, or protocol, as described herein. For example, the communications interface(s) 714 can comprise a wired interface and/or one or more of a cellular radio, a wireless (e.g., IEEE 802.1x-based) interface, a Bluetooth® interface, and so on.

In various embodiments, the computer-readable memory 704 comprises non-transitory computer-readable memory 704 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 704 may also be described as computer storage media and may include volatile and nonvolatile, removable and non-removable media implemented in any method or technology for storage of information, such as computer readable instructions, data structures, program modules, or other data. Computer-readable memory 704, removable storage 706 and non-removable storage 708 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the UE 102. Any such computer-readable storage media may be part of the UE 102.

The memory 704 can include a PDTS module 718 (i.e., computer-executable instructions (or logic) that, when executed, by the processor(s) 702, perform the various acts and/or processes disclosed herein. For example, the PDTS module 718 is configured to carry out the activation, utilization, and deactivation of the PDTS, as described herein. The memory 704 can further be used to store URSP rules 720, which may represent existing URSP rules 720 of the UE 102, and which may be replaced by new URSP rules 112, as described herein.

Figure 8:
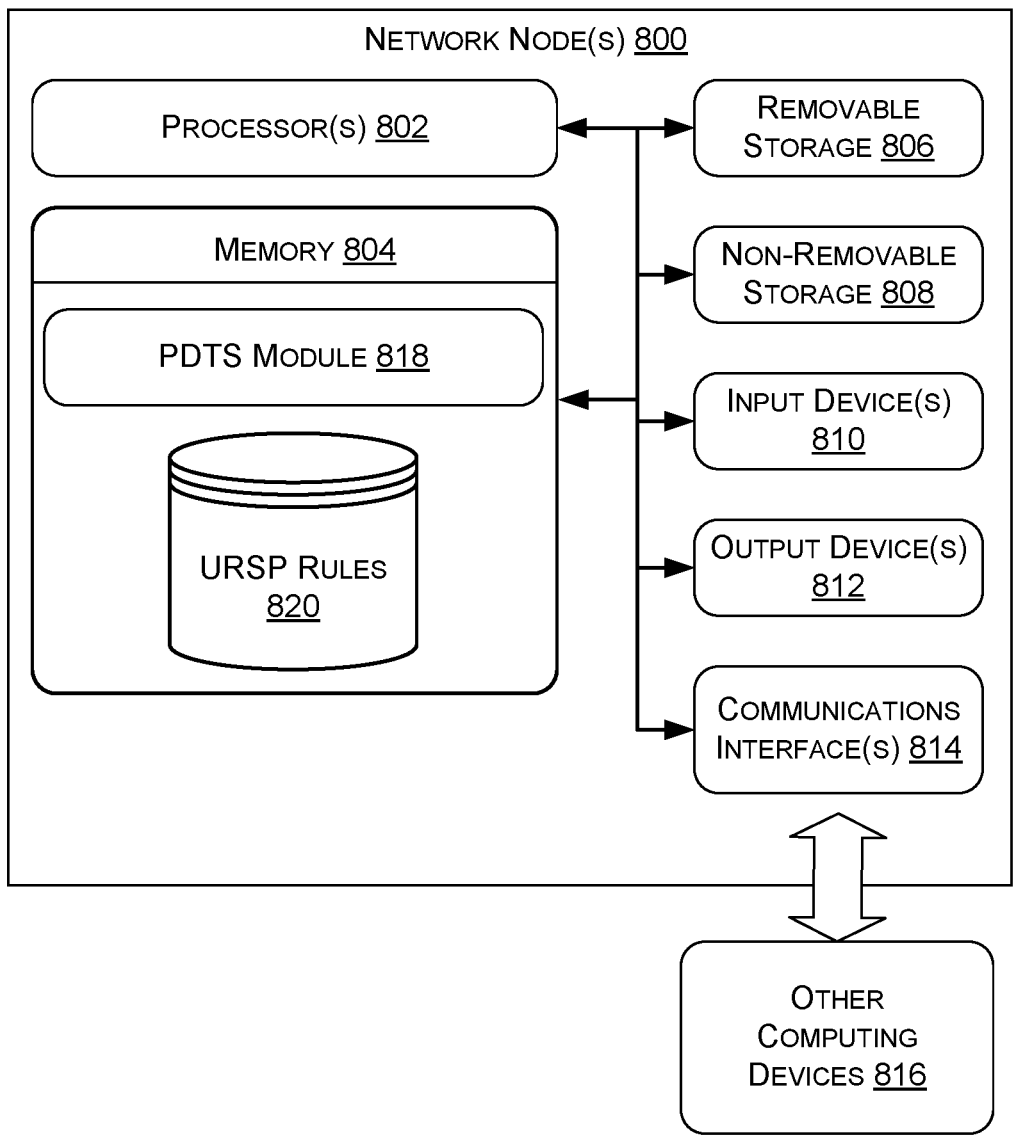
FIG. 8 is a block diagram of an example network node(s) with logic to activate/deactivate the PDTS for one or more UEs, according to various embodiments.

FIG. 8 is a block diagram of an example network node(s) 800 with logic to activate/deactivate the PDTS for one or more UEs, according to various embodiments. The network node(s) 800 may be representative of a network node(s) of the core network 106, and/or a network node(s) of a 5G system, and the network node(s) 800 may be configured to perform the operations of the example process 600 described herein.

As shown, the network node(s) 800 may include one or more processors 802 and one or more forms of computer-readable memory 804. The network node(s) 800 may also include additional storage devices. Such additional storage may include removable storage 806 and/or non-removable storage 808. The memory 804, the removable storage 806, and the non-removable storage 808 may be implemented similarly to the memory 704, removable storage 706, and non-removable storage 708 described above with reference to FIG. 7, and will not be described further for the sake of brevity.

The network node(s) 800 may further include input devices 810, output devices 812, and communications interface(s) 814 for communicating with other computing devices 816. These too may be implemented similarly to the input devices 710, output devices 712, and communications interface(s) 714 described above with reference to FIG. 7, and will not be described further for the sake of brevity.

The memory 804 can include a PDTS module 818 (i.e., computer-executable instructions (or logic) that, when executed, by the processor(s) 802, perform the various acts and/or processes disclosed herein. For example, the PDTS module 818 is configured to carry out the activation, implementation, and deactivation of the PDTS on behalf of UEs 102, as described herein. The memory 804 can further be used to store URSP rules 820, which may represent, for example, URSP rules 112 to replace existing URSP rules on UEs 102, as described herein The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:
1. A user equipment (UE) comprising:
a processor; and
memory storing a first set of UE route selection policy (URSP) rules and computer-executable instructions that, when executed by the processor, cause the UE to:
register for a first network slice and a second network slice, wherein the second network slice is configured to provide higher priority transport of data packets during protocol data unit (PDU) sessions than the first network slice;
receive user input to activate a priority data transport service (PDTS);
send a PDU session establishment request;
receive, based at least in part on the PDU session establishment request, a second set of URSP rules;

delete the first set of URSP rules from the memory at a time of receiving the second set of URSP rules;

send, based at least in part on a URSP rule of the second set of URSP rules, one or more data packets during a PDU session via at least one of:
the second network slice; or
a third network slice that is configured to provide higher priority transport of data packets during PDU sessions than the first network slice;

receive second user input to deactivate the PDTS;

send a second PDU session establishment request;

receive, based at least in part on the second PDU session establishment request, the first set of URSP rules to replace the second set of URSP rules in the memory; and send, based at least in part on a URSP rule of the first set of URSP rules, one or more second data packets during a second PDU session via the first network slice.

2. The UE of claim 1, wherein:
the user input corresponds to at least one of navigating a browser to a site or launching an application; and
the computer-executable instructions, when executed by the processor, further cause the UE to, prior to receiving the second set of URSP rules, determine that a URSP rule of the first set of URSP rules specifies an identifier (ID) of at least one of the site or the application.

3. The UE of claim 1, wherein the URSP rule of the second set of URSP rules prevents the one or more data packets from being sent over Wi-Fi during the PDU session.

4. The UE of claim 1, wherein:
the UE is subscribed to the PDTS;
the second network slice is usable by UEs that are subscribed to the PDTS to activate and use the PDTS; and
the one or more data packets are sent during the PDU session via the second network slice.

5. The UE of claim 4, wherein the computer-executable instructions, when executed by the processor, further cause the UE to, prior to receiving the second set of URSP rules, send credentials for authenticating with the PDTS.

6. The UE of claim 1, wherein:
the UE is not subscribed to the PDTS;
the second network slice is usable by UEs that are not subscribed to the PDTS to activate the PDTS;
the user input corresponds to navigating a browser to a site;
the computer-executable instructions, when executed by the processor, further cause the UE to, prior to receiving the second set of URSP rules:
send, based at least in part on a URSP rule of the first set of URSP rules, the PDU session establishment request via the second network slice; and
receive, during an intermediate PDU session, second user input corresponding to credentials entered by a user of the UE via the site; and
the one or more data packets are sent during the PDU session via the third network slice.

7. A method comprising:
based on a first set of user equipment route selection policy (URSP) rules stored in memory of a user equipment (UE), registering, by the UE, for a first network slice and a second network slice, wherein the second network slice is configured to provide higher priority transport of data packets during protocol data unit (PDU) sessions than the first network slice;

receiving, by the UE, user input to activate a priority data transport service (PDTS), wherein the UE is not subscribed to the PDTS, the second network slice is usable by UEs that are not subscribed to the PDTS to activate the PDTS, and the user input corresponds to navigating a browser to a site;

sending, by the UE and based at least in part on a URSP rule of the first set of URSP rules, a PDU session establishment request via the second network slice;

receiving, during an intermediate PDU session, second user input corresponding to credentials entered by a user of the UE via the site;

after sending the PDU session establishment request and after receiving the second user input, receiving, by the UE, based at least in part on the PDU session establishment request, a second set of URSP rules; and sending, by the UE, based at least in part on a URSP rule of the second set of URSP rules, one or more data packets during a PDU session via
a third network slice that is configured to provide higher priority transport of data packets during PDU sessions than the first network slice.

8. The method of claim 7, wherein
the method further comprises, prior to the receiving of the second set of URSP rules, determining that a URSP rule of the first set of URSP rules specifies an identifier (ID) of the site.

9. The method of claim 7, the method further comprising:
deleting the first set of URSP rules from memory of the UE at a time of the receiving of the second set of URSP rules;
receiving third user input to deactivate the PDTS;
sending, by the UE, a second PDU session establishment request;
receiving, based at least in part on the second PDU session establishment request, the first set of URSP rules to replace the second set of URSP rules in the memory; and
sending, based at least in part on a URSP rule of the first set of URSP rules, one or more second data packets during a second PDU session via the first network slice.

10. The method of claim 7, wherein the URSP rule of the second set of URSP rules prevents the one or more data packets from being sent over Wi-Fi during the PDU session.

11. The method of claim 7, further comprising, prior to the receiving of the second set of URSP rules, sending the credentials for authenticating with the PDTS.

12. A method comprising:
registering a user equipment (UE) for a first network slice and a second network slice, wherein the second network slice is configured to provide higher priority transport of data packets during protocol data unit (PDU) sessions than the first network slice;

receiving, from the UE, a PDU session establishment request via the second network slice, the PDU session establishment request being associated with activation of a priority data transport service (PDTS);

based on the PDU session establishment request, sending, to the UE, a first set of UE route selection policy (URSP) rules, wherein the first set of URSP rules replaces a second set of URSP rules in memory of the UE;

routing one or more data packets associated with a PDU session involving the UE via at least one of:
- the second network slice; or
- a third network slice that is configured to provide higher priority transport of data packets during PDU sessions than the first network slice;

receiving, from the UE, a second PDU session establishment request associated with deactivation of the PDTS;

sending, based at least in part on the second PDU session establishment request, the second set of URSP rules to replace the first set of URSP rules in the memory; and routing, based at least in part on a URSP rule of the second set of URSP rules, one or more second data packets during a second PDU session via the first network slice.

13. The method of claim 12, wherein the second network slice is usable by UEs that are subscribed to the PDTS to activate and use the PDTS, the method further comprising, prior to the registering:

receiving, from the UE, a request to register for the first network slice and the second network slice; and determining that a subscription of the UE has network slice support for the second network slice, wherein the registering is based at least in part on the determining that the subscription of the UE has the network slice support.

14. The method of claim 12, wherein the second network slice is usable by UEs that are subscribed to the PDTS to activate and use the PDTS, the method further comprising, after the receiving of the PDU session establishment request, performing secondary slice authentication based at least in part on credentials received from the UE.

15. The method of claim 14, wherein the performing the secondary slice authentication comprises running extensible authentication protocol (EAP) between the UE and an authentication, authorization and accounting (AAA) server.

16. The method of claim 12, wherein the second network slice is usable by UEs that are not subscribed to the PDTS to activate the PDTS, the method further comprising, after the receiving of the PDU session establishment request, authenticating credentials entered by a user of the UE via a site for activating the PDTS.

17. The method of claim 12, wherein a URSP rule of the first set of URSP rules prevents the one or more data packets from being routed to or from the UE over Wi-Fi during the PDU session.

\* \* \* \* \*